US011524687B2

(12) United States Patent
Watanabe

(10) Patent No.: US 11,524,687 B2
(45) Date of Patent: Dec. 13, 2022

(54) CONTROL APPARATUS FOR VEHICLE

(71) Applicant: Toyota Jidosha Kabushiki Kaisha, Toyota (JP)

(72) Inventor: Ryochi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 16/784,815

(22) Filed: Feb. 7, 2020

(65) Prior Publication Data

US 2020/0262434 A1 Aug. 20, 2020

(30) Foreign Application Priority Data

Feb. 18, 2019 (JP) .............................. JP2019-026239

(51) Int. Cl.
| | | |
|---|---|---|
| *B60W 30/18* | (2012.01) | |
| *B60T 8/175* | (2006.01) | |
| *B60T 7/12* | (2006.01) | |
| *B60W 40/068* | (2012.01) | |
| *B60W 10/18* | (2012.01) | |

(52) U.S. Cl.
CPC ....... *B60W 30/18118* (2013.01); *B60T 7/122* (2013.01); *B60T 8/175* (2013.01); *B60W 10/18* (2013.01); *B60W 40/068* (2013.01); *B60L 2240/12* (2013.01); *B60T 2201/06* (2013.01); *B60W 2420/403* (2013.01)

(58) Field of Classification Search
CPC ........... B60W 30/18118; B60W 10/18; B60W 40/068; B60W 2420/403; B60T 7/122; B60T 8/175; B60T 2201/06; B60L 2240/12
See application file for complete search history.

(56) References Cited

U.S. PATENT DOCUMENTS

| 6,321,154 B1 * | 11/2001 | Schmitt ........... B60W 30/18027 701/84 |
| 2003/0229439 A1 | 12/2003 | Polzin |
| 2007/0090692 A1 * | 4/2007 | Kamikado .............. B60T 7/122 303/192 |
| 2012/0078483 A1 * | 3/2012 | Yajima ................ B60W 40/068 701/73 |
| 2015/0329090 A1 * | 11/2015 | Watanabe ................. B60T 7/12 701/93 |

FOREIGN PATENT DOCUMENTS

| DE | 102006021652 A1 | 11/2006 |
| JP | 2003-291793 A | 10/2003 |
| JP | 2006-142902 A | 6/2006 |
| JP | 2018-090161 A | 6/2018 |
| JP | 2018-095076 A | 6/2018 |

* cited by examiner

*Primary Examiner* — James M McPherson
*Assistant Examiner* — Bakari Underwood
(74) *Attorney, Agent, or Firm* — Dinsmore & Shohl LLP

(57) ABSTRACT

Provided is a control apparatus for a vehicle, the control apparatus being configured to determine a road surface μ state of a road in front of the vehicle based on an image of a front region of the vehicle, and change a magnitude of an amount of reduction in a braking force per unit time in accordance with the determined road surface μ state in braking force cancel control executed after hill-hold control

2 Claims, 11 Drawing Sheets

CONTROL APPARATUS FOR VEHICLE

CROSS-REFERENCES TO RELATED APPLICATION

The present application claims priority to Japanese patent application No. JP 2019-026239 filed on Feb. 18, 2019, the content of which is hereby incorporated by reference in its entirety.

BACKGROUND

1. Technical Field

The present disclosure relates to a control apparatus for a vehicle configured to determine a state of a road surface on which the vehicle is traveling based on a captured image in front of the vehicle, and execute braking force cancel control based on the determined state of the road surface. The braking force cancel control is control for decreasing braking forces applied to wheels through hill-hold control to zero.

2. Description of the Related Art

Hitherto, there has been proposed a control apparatus for a vehicle configured to execute hill-hold control for maintaining braking forces applied to wheels to thereby prevent the vehicle from moving backward on a slope.

The control apparatus executes the hill-hold control when a driver releases his/her foot from a brake pedal after the driver depresses the brake pedal to stop the vehicle on the slope.

A control apparatus (hereinafter, referred to as a "related-art apparatus") disclosed In Japanese Patent Application Laid-open No. 2006-142902 is configured to execute braking force cancel control for decreasing braking forces applied to wheels to zero when a predetermined cancel condition, is satisfied during the execution of the hill-hold control.

The vehicle may start moving on a slope which is a split μ road. The "split μ road" refers to a road in which a road surface friction coefficient (hereinafter, referred to as a "friction coefficient μ") of a road surface on a left side of the vehicle and the friction coefficient μ of a road surface on a right side of the vehicle are different from each other. In the above-mentioned situation, when the related-art apparatus executes the braking force cancel control, there is a possibility that a drive wheel which is in contact with the road surface having the lower friction coefficient μ slips. Therefore, when the vehicle starts on the slope which is the split μ road, the vehicle may move backward.

The present disclosure provides a control apparatus for a vehicle capable of reducing the possibility that the vehicle moves backward in a situation in which the vehicle starts on a slope which is the split μ road.

SUMMARY

A control apparatus for a vehicle according to one embodiment includes: an imaging device configured to capture a front region of the vehicle to acquire a front region image; a wheel speed sensor configured to detect a wheel speed of each of a plurality of wheels included in the vehicle; a driving device configured to control a driving force applied to drive wheels among the plurality of wheels; and a braking device configured to control a braking force applied to each of the plurality of wheels.

The control apparatus further includes a controller configured to execute hill-hold control for, when the vehicle is in a stopped state, controlling the braking device to apply the braking force to the plurality of wheels during a period from a first time point at which a driver stops operating a brake pedal to a second time point at which the driver starts operating an accelerator pedal, and execute braking force cancel control for decreasing the braking force to zero for each of the plurality of wheels on and after the second time point.

The controller is further configured to determine whether a road in front of the vehicle is a split μ road or a left-and-right uniform μ road based on the front region image. The split μ road is a road which can be considered that there is a left-and-right μ difference. The left-and-right uniform μ road is a road which can be considered that there is no left-and-right μ difference. The left-and-right μ difference represents a magnitude of a difference between a friction coefficient of a road surface with which the wheel on a left side of the vehicle is in contact, and the friction coefficient of a road surface with which the wheel on a right side of the vehicle is in contact.

The controller is further configured to, when executing the braking force cancel control, decrease the braking force such that a magnitude of an amount of reduction in the braking force per unit time when determining that the road in front of the vehicle is the split μ road becomes smaller than a magnitude of an amount of reduction in the braking force per unit time when determining that the road in front of the vehicle is the left-and-right uniform μ road.

According to the control apparatus, in the braking force cancel control, the magnitude of the amount of reduction in the braking force per unit time when determining that the road in front of the vehicle is the split μ road becomes smaller than the magnitude of the amount of reduction in the braking force per unit time when determining that the road in front of the vehicle is the left-and-right uniform μ road. Therefore, the drive wheels are rotated gradually without being rapidly rotated. The slip of the drive wheel on a road surface side having the lower friction coefficient μ is avoided, and that drive wheel can easily grip the road surface of the split μ road, Furthermore, the driving force of the drive wheel on the other road surface side having the higher friction coefficient μ is gradually transmitted to the road surface. Accordingly, the control apparatus can reduce the possibility that the vehicle moves backward when the vehicle starts on a slope which is the split μ road.

In one aspect of the control apparatus, the controller is further configured to, when executing the braking force cancel control, in a situation in which a magnitude of a wheel speed difference between the wheel speed of one wheel among the drive wheels and the wheel speed of the other wheel among the drive wheels is equal to or larger than a predetermined first threshold, decrease the braking force such that a magnitude of an amount of reduction in the braking force per unit time for a first drive wheel becomes smaller than a magnitude of an amount of reduction in the braking force per unit time for the wheels other than the first drive wheel. The first drive wheel is a wheel having a higher wheel speed among the drive wheels.

According to this aspect, in the case where the vehicle starts on the split μ road, when the magnitude of the wheel speed difference is equal to or larger than the first threshold, the controller decreases the magnitude of the amount of reduction per unit time in the braking force applied to the first drive wheel having the higher wheel speed among the drive wheels. For example, the controller can apply to the first drive wheel having the higher wheel speed the braking force larger than that applied to the other drive wheel. Accordingly, it is possible to suppress the slip of the first drive wheel.

In one aspect of the control apparatus, the controller is further configured to, on and after an elapsed time since the braking force cancel control is started becomes longer than a predetermined time threshold, maintain the braking force applied to the first drive wheel and decrease the braking forces applied to the wheels other than the first drive wheel when the magnitude of the wheel speed difference is larger than a predetermined second threshold which is smaller than the predetermined first threshold. In addition, the controller is configured to, on and after the elapsed time becomes longer than the time threshold, decrease the braking forces for all the plurality of wheels when the magnitude of the wheel speed difference is equal to or smaller than the predetermined second threshold.

According to this aspect, on and after the elapsed time since the braking force cancel control is started becomes longer than the time threshold, when the magnitude of the wheel speed difference is larger than the predetermined second threshold, the controller maintains the braking force applied to the first drive wheel, and decreases the braking forces applied to the wheels other than the first drive wheel. Therefore, it is possible to suppress the slip of the first drive wheel. Therefore, the driving force of the other drive wheel is transmitted to the road surface while suppressing the slip of the first drive wheel. As a result, the vehicle can start on a slope which is the split μ road without moving backward.

In one aspect of the control apparatus, the controller is further configured to set the predetermined first threshold such that the predetermined first threshold when determining that the road in front of the vehicle is the split μ road becomes smaller than the predetermined first threshold when determining that the road in front of the vehicle is the left-and-right uniform μ road.

According to this aspect, when it is determined that the road in front of the vehicle SV is the split μ road, before the magnitude of the wheel speed difference becomes large, the amount of reduction per unit time in the braking force applied to the drive wheel on the road surface side having the lower friction coefficient μ becomes smaller. Therefore, it is possible to further reduce the possibility of the slip of the drive wheel on the road surface side having the lower friction coefficient μ.

According to one or more embodiments, the above-mentioned controller is implemented by a microprocessor programmed for performing one or more operations and/or functionality described herein. In addition, the controller may be implemented, in whole or in part, by specifically configured to hardware (e.g., by one or more application specific integrated circuits or ASIC(s)).

In the above description, in order to facilitate understanding of the present disclosure, a name and/or reference numeral used in the embodiment described later is enclosed in parentheses and assigned to each of the constituent features corresponding to the embodiment. However, each of the constituent features is not limited to the embodiment defined by the name and/or reference numeral.

DETAILED DESCRIPTION

Now, referring to the accompanying drawings, a description is given of one or more embodiments. The accompanying drawings are illustrations of one or more specific embodiments, but those illustrations are examples to be used for the understanding of the embodiment(s), and are not to be used to limit the interpretation of the present disclosure.

<Configuration>

Figure 1:
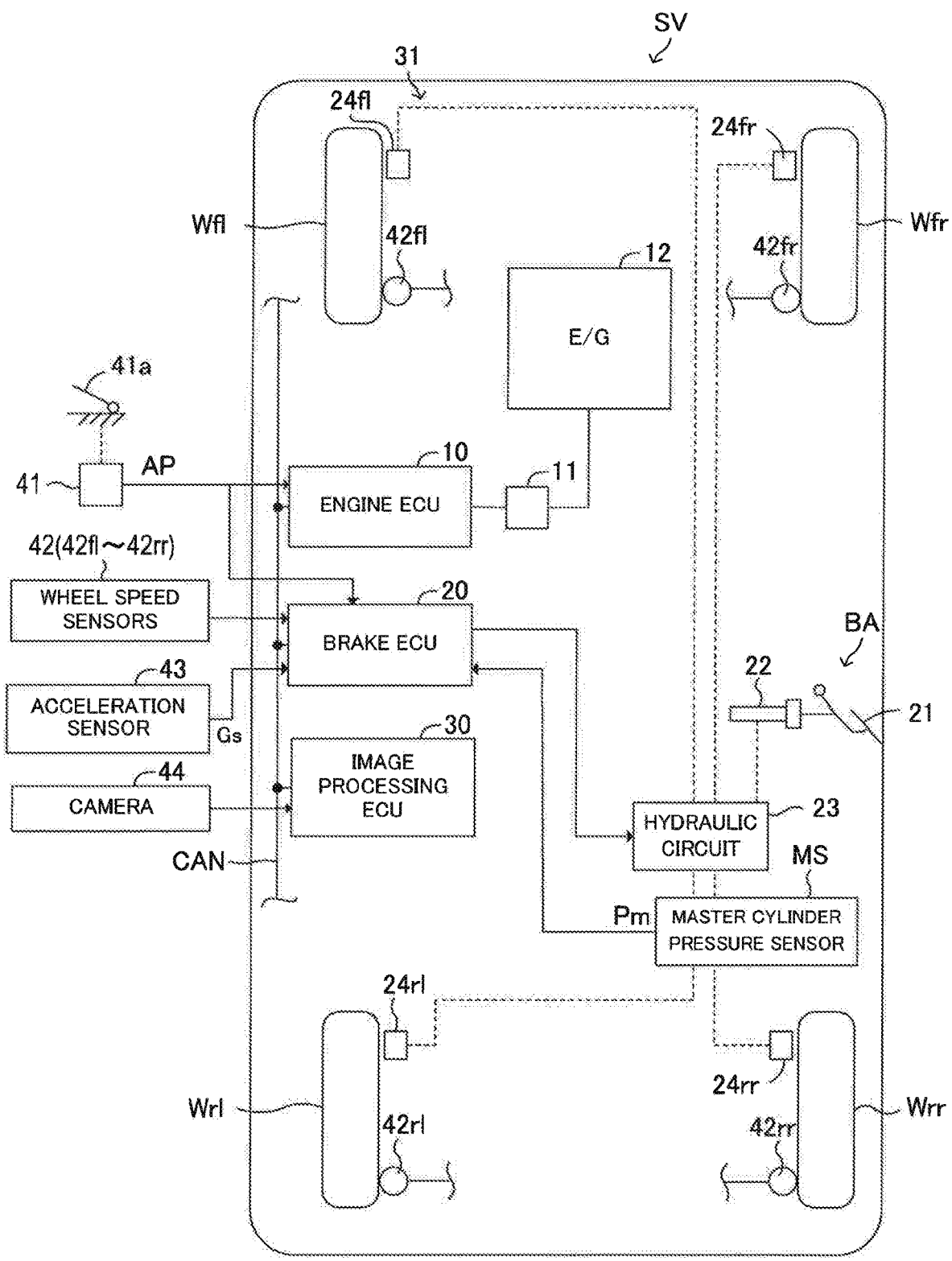
FIG. 1 is a schematic configuration diagram of a vehicle provided with a control apparatus according to an embodiment.

As illustrated in FIG. 1, a control apparatus according to an embodiment of the present disclosure is applied to a vehicle SV. The vehicle SV includes a left front wheel Wfl, a right front wheel Wfr, a left rear wheel Wrl and a right rear wheel Wrr. The control apparatus includes an engine ECU 10, a brake ECU 20, and an image processing ECU 30.

The above-mentioned ECUs are connected to one another so as to be able to mutually transmit and receive data via a controller area network (CAN). That is, those ECUs can communicate with each other. Each of the ECUs includes a microcomputer. The microcomputer herein includes a CPU, a ROM, a RAM, a nonvolatile memory, an interface I/F, and the like. The CPU executes instructions (programs and routines) stored in the ROM to realize various functions described later.

The engine ECU 10 is electrically connected to engine state amount sensors (not shown). The engine state amount sensors include an accelerator pedal operation amount sensor 41, and other sensors. The accelerator pedal operation amount sensor 41 is configured to detect an operation amount (also referred to an "accelerator opening") AP of an accelerator pedal 41a of the vehicle SV, and generate an output signal indicative of the operation amount AP.

The engine ECU 10 is electrically connected to an engine actuator 11. The engine actuator 11 includes a throttle valve actuator configured to change an opening degree of a throttle valve of an engine 12. The engine ECU 10 drives the engine actuator 11 based on the operation amount AP detected by the accelerator pedal operation amount sensor and operating state amounts (including an engine speed) detected by the other engine state amount sensors. Thus, the engine ECU 10 is capable of changing a torque to be generated by the engine 12. The torque generated by the engine 12 is transmitted to drive wheels (in the present example, the left front wheel Wfl, and the right front wheel Wfr) via a transmission (not shown). Therefore, the engine ECU 10 is capable of controlling the activation of the engine actuator 11 to control a driving force of the vehicle SV to thereby change an acceleration or an acceleration state.

When the vehicle is a hybrid vehicle, the engine ECU 10 is capable of controlling a driving force of the vehicle to be generated by one of or both of "an engine and a motor" serving as vehicle driving sources. Further, when the vehicle is an electric vehicle, the engine ECU 10 is capable of controlling a driving force of the vehicle to be generated by a motor serving as a vehicle driving source.

The brake ECU 20 is electrically connected to the accelerator pedal operation amount sensor 41, wheel speed sensors 42 (42fl, 42fr, 42rl and 42rr), an acceleration sensor 43, and a braking device BA.

Each of the wheel speed sensors 42 is configured to generate one pulse each time the corresponding wheel (Wfl, Wfr, Wrl, or Wrr) rotates by a predetermined angle. In the following description, a suffix "fl" corresponds to the left front wheel Wfl, a suffix "fr" corresponds the right front wheel Wfr, a suffix "rl" corresponds to the left rear wheel Wrl, and a suffix "rr" corresponds to the right rear wheel Wrr. A suffix "i" represents one of "fl, fr, rl, and rr". In addition, a suffix "f*" represents one of "fl and fr", and a suffix "r*" represents one of "rl and rr".

The acceleration sensor 43 is configured to detect an acceleration Gs in a front and-rear direction of the vehicle SV and generate an output signal indicative of the detected acceleration Gs.

The braking device BA includes a brake pedal 21, a master cylinder 22, a master cylinder pressure sensor MS, a hydraulic circuit 23, wheel cylinders 24 (24fl, 24fr, 24rl and 24rr), and the like.

The master cylinder pressure sensor MS is configured to generate an output signal indicative of a pressure Pm (hereinafter, referred to as "master cylinder pressure") of the master cylinder 22 driven in response to a depression operation of the brake pedal 21 by a driver.

The hydraulic circuit 23 includes a reservoir (not shown), an oil pump (not shown), various valve devices (not shown) and the like, and functions as a brake actuator.

The braking device BA applies a braking force proportional to a pressure of hydraulic oil supplied to the wheel cylinder 24i (that is, braking pressure of the wheel cylinder 24i) to the corresponding wheel Wi. Specifically, the brake ECU 20 calculates, based on the master cylinder pressure Pm, a target braking force Fbfl of the left front wheel Wfl, a target braking force Fbfr of the right front wheel Wfr, a target braking force Fbrl of the left rear wheel Wrl, and a target braking force Fbrr of the right rear wheel Wrr. The brake ECU 20 controls a braking pressure of the wheel cylinder 24i corresponding to each wheel Wi in such that, an actual braking force of each wheel Wi matches up with (becomes equal to) the corresponding target braking force Fbi.

Further, as describer later, the brake ECU 20 can control the braking pressure of each wheel cylinder 24i by controlling the hydraulic circuit 23 regardless of the depression amount of the brake pedal 21 by the driver.

Furthermore, the brake ECU 20 counts the number of pulses generated by the wheel speed sensor 42i per a predetermined measurement time $\Delta T$, and calculates a rotation speed (wheel angular velocity) of the wheel Wi provided with that wheel speed sensor 42i based on the counted value.

The brake ECU 20 calculates a wheel speed Vwi (circumferential velocity of the wheel) according to the following Expression (1), In Expression (1), "ri" is a dynamic radius of the wheel (tire), "ωi" is the rotation speed of the wheel (angular velocity of the wheel), "N" is the number of teeth of a rotor (number of pulses generated per one rotation of the rotor), and "Pi" is the number of pulses counted per the measurement time $\Delta T$.

$$Vwi = ri \cdot \omega i = ri \cdot (2 \cdot \pi/N) \cdot (Pi/\Delta T) \quad (1)$$

The image processing ECU 30 is electrically connected to a camera (imaging device) 44. For example, the camera 44 includes an imaging element such as a charge coupled device (CCD) and a CMOS image sensor (CIS). The camera 44 captures a front region of the vehicle SV to acquire image data of the front region. Hereinafter, the image data of the front region of the vehicle SV is simply referred to as a "front region image". The front region image includes a road surface in front of the vehicle SV.

As described later, the image processing ECU 30 determines a road surface state (hereinafter, referred to as a "road surface $\mu$ state") of a road in front of the vehicle SV based on the front region image. The image, processing ECU 30 transmits a determination result of the road surface $\mu$ state to the brake ECU 20.

Hereinafter, information on the current operating state of the driver, such as the operation amount AP of the accelerator pedal and the master cylinder pressure Pm may be referred to as "operating state information (or operating amount information)".

<Overview of Traction Control (TRC)>

The brake ECU 20 is configured to execute traction control for suppressing slip of the drive wheel (the left front wheel Wfl or the right front wheel Wfr) during acceleration of the vehicle SV (including the start of the travel of the vehicle SV). The traction control is well known, and therefore, it will be briefly described below. The "slip of the drive wheel" includes a case in which the drive wheel Wf* is lifted from a road surface, and a case in which the drive wheel Wf* enters a slip state on a road surface. The traction control is also referred to as "driving slip control", and is hereinafter simply referred to as "TRC".

The brake ECU 20 calculates the wheel speed Vwi for each wheel Wi based on the signals from the wheel speed sensor 42i as described above, The brake ECU 20 calculates a slip amount SAf* for each drive wheel Wf* based on those wheel speeds Vwhi. The slip amount SAf* is one of indicators representing the degree of slip of the drive wheel Wf*, and is also referred to as a "slip indicator value", For example, the slip amount SAf* is obtained according to the following Expression (2), "Va" is a reference speed, for example, a speed of a vehicle body estimated from one or more wheel speeds. For example, the reference speed Va is calculated from the wheel speed Vwr* of the non-drive wheel (in this example, Wr*), or an average value of the wheel speeds Vwrl and Vwrr. Therefore, the slip amount SAf* can be also said to be a value corresponding to a wheel speed difference between the drive wheel Wf* and the non-drive wheel (trailing wheel).

$$SAf* = Vwf* - Va \quad (2)$$

A slip ratio SBf* may be adopted as the slip indicator value. The slip ratio SBf* is obtained according to the following Expression (3).

$$SBf* = ((Vwf* - Va)/Va) \times 100\% \quad (3)$$

When the slip amount SAf* of the drive wheel Wf* exceeds a predetermined TRC start threshold Th_trc (threshold for determining whether to start the TRC) during acceleration of the vehicle SV, the brake ECU 20 determines that the drive wheel Wf* is slipping. The, brake ECU 20 determines the "drive wheel Wf* which is determined to be slipping" as a "TRC target wheel". Thus, the brake ECU 20 starts the TRC on the TRC target wheel Wf*, When the TRC is frequently executed, the driver feels uncomfortable. Therefore, the TRC start threshold Th_trc is normally set to a relatively high value.

The brake ECU 20 controls the hydraulic circuit 23 to increase the braking pressure of the wheel cylinder 24f* corresponding to the TRC target wheel Wf*, In this manner, the braking force is applied to the TRC target wheel Wf* to thereby gradually decrease the slip amount SAf* of the TRC target wheel Wf*.

Thereafter, the brake ECU 20 repeatedly executes increasing and decreasing the braking pressure of the wheel cylinder 24f* corresponding to the TRC target wheel Wf*, When a predetermined TRC termination condition is satisfied, the brake ECU 20 terminates/ends the TRC. For example, the TRC termination condition is satisfied when a situation in which the slip amount SAf* of the TRC target wheel Wf* is smaller than a predetermined TRC termination threshold Th_trcend has continued for a predetermined time. The TRC termination threshold Th_trcend is smaller than the TRC start threshold Th_trc.

The vehicle SV may be a vehicle capable of independently controlling driving torques applied to the drive wheels Wfl and Wfr independently of each other (individually). In this configuration, the control apparatus may individually control the driving torque distributed to the TRC target wheel Wf* to thereby decrease the slip amount SAf* of the TRC target wheel Wf*.

<Overview of Hill-Hold Control>

The brake ECU 20 is configured to execute hill-hold control when the vehicle SV starts moving on a slope. The hill-hold control is also referred to as "hill start assist control". The hill-hold control is well known, and therefore, it will be briefly described below. The hill-hold control is control for, in a situation in which the vehicle SV starts from a stopped state on a slope, applying the braking forces to the wheels Wi during a period from a lime point (first time point) at which the driver stops operating the brake pedal 21 to a time point (second time point) at which the driver starts operating the accelerator pedal 41a. This control can prevent the vehicle SV from moving backward when the vehicle SV starts on a slope.

The brake ECU 20 executes the hill-hold control when a predetermined hill-hold control start condition is satisfied. For example, the hill-hold control start condition is satisfied when the driver releases his/her foot from the brake pedal 31 after the driver has depressed the brake pedal 21 for a predetermined period Tpr (for example, 2 seconds) or longer.

When the hill-hold control start condition is satisfied, the brake ECU 20 continues applying to the wheels Wi the braking forces applied immediately before the driver releases his/her foot from the brake pedal 21. That is, the braking forces applied immediately before the driver releases his/her foot from the brake pedal 21 are maintained.

The brake ECU 20 executes braking force cancel control when a predetermined hill-hold control termination condition is satisfied. The braking force cancel control is control for decreasing the braking force to zero for each wheel Wi as described later. For example, the hill-hold control termination condition is satisfied when the driver starts operating the accelerator pedal 41a during the execution of the hill-hold control.

<Outline of Operation>

For example, it is assumed that the braking force cancel control is executed after the hill-hold control in a situation in which the vehicle SV starts on each of the following two slopes 1 and 2. The slope 1 is a "left-and-right uniform μ road". The slope 2 is a "split μ road".

(Left-and-right uniform μ road): The friction coefficient μ (left road surface p) of the road surface with which the wheel (in this example, the left front wheel Wfl as the drive wheel) on the left side of the vehicle SV is in contact, and the friction coefficient μ (right road surface μ) of the road surface with which the wheel (in this example, the right front wheel Wfr as the drive wheel) on the right side of the vehicle SV is in contact are substantially equal to each other.

(Split μ road): There is a difference between the left road surface μ and the right road surface μ.

When the vehicle SV starts on the slope 1 which is the left-and-right uniform μ road, even if the braking forces applied to the wheels Wi are rapidly decreased to zero through the braking force cancel control, the possibility that the drive wheel Wf* slips is low.

On the other hand, when the vehicle SV starts on the slope 2 which is the split μ road, if the braking forces applied to the wheels Wi are rapidly decreased to zero through the braking force cancel control, there is high possibility that the drive wheel Wf* which is in contact with the road surface having the lower friction coefficient μ slips. However, the TRC start threshold. Th_trc, is typically a relatively high value, and therefore, the time until the TRC is started becomes longer. There is a possibility that the vehicle SV moves backward on the slope 2.

In view of the above, the control apparatus according to the present embodiment determines the road surface μ state of the road in front of the vehicle SV based on the front region image acquired by the camera 44. When executing the braking force cancel control, the control apparatus changes an amount of reduction in the braking force per unit time based on the determined road surface μ state, Specifically, when determining that the road in front of the vehicle is the split p road, the control apparatus sets the amount of reduction in the braking force per unit time in the braking force cancel control to a value smaller than the amount of reduction in the braking force per unit time when determining that the road in front of the vehicle is the left-and-right uniform μ road. When the road in front of the vehicle is the split μ road, the braking forces applied to the wheels are gradually decreased with a relatively small change amount per unit time. Therefore, the control apparatus can avoid the slip of the drive wheel Wr which is in contact with the road surface having the lower friction coefficient μ. As a result, that drive wheel Wf* can easily grip the road surface of the split μ road. Further, the driving force of the other drive wheel Wf* which is in contact with the road surface having the higher friction coefficient μ is gradually transmitted to the road surface. Accordingly, the control apparatus can reduce the possibility that the vehicle SV moves backward when the vehicle SV starts moving on a slope which is the split μ road.

<Determination Method of Road Surface μ State Based on Front region image>

Figure 2:
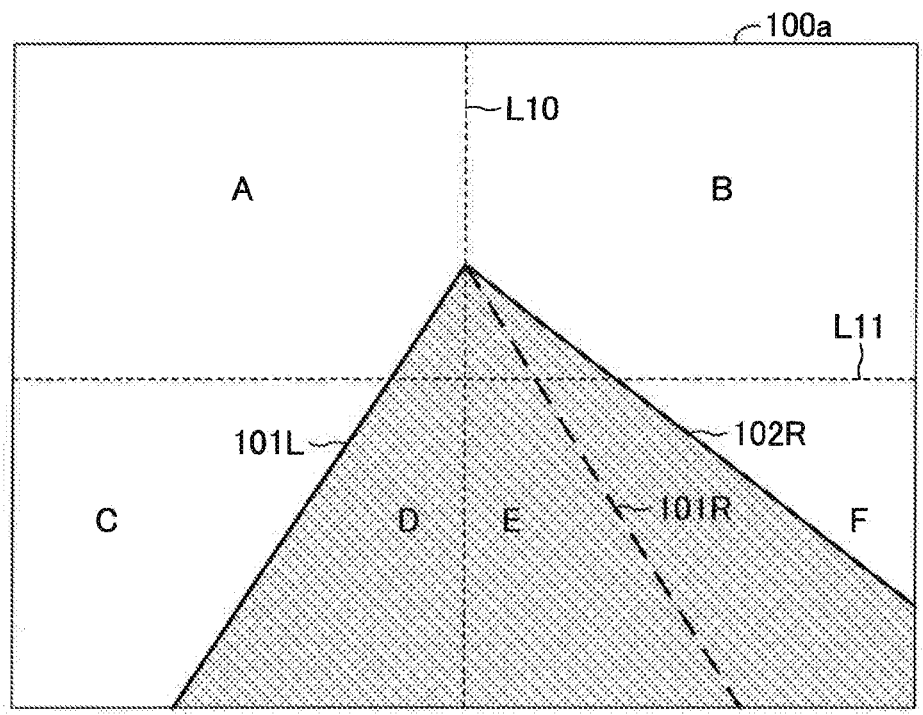
FIG. 2 is a diagram for explaining a method for determining a road surface μ state based on an image of a front region of the vehicle.

Next, a method for determining the road surface μ state of the road in front of the vehicle SV based on the front region image will be described. As illustrated in FIG. 2, the image processing ECU 30 first divides a front region image 100a acquired from the camera 44 into a plurality of rectangular regions. The front region image 100a is evenly divided into four regions by a first centerline L10 which passes through a center in a horizontal direction of the image and extends in a vertical direction of the image, and a second centerline L11 which passes through a center in the vertical direction of the image and extends in the horizontal direction, The front region image 100a is further divided by partition lines (lane marking lines) included in the front region image 100a. The partition lines include lines defining a lane (own lane) on which the vehicle SV is traveling, that is, a left partition line 101L (white solid line in this example) and a right partition line 101R (white broken line in this example). Therefore, the front region image 100a is finally divided into six regions (regions A to F). A partition line 102 R defining a lane adjacent to the own lane is not used for dividing the front region image 100a.

As described above, an upper part of the front region image 100a is divided into a region A and a region B in order from left to right. A lower part of the front region image 100a is divided into a region C, a region D, a region E, and a region F in order from left to right.

Next, the image processing ECU 30 calculates, for each of the regions A to F, a ratio at which characteristics of a "road surface with a relatively high friction coefficient μ" are included. Hereinafter, the above-mentioned characteristics will be referred to as "high μ characteristics". Further, the above-mentioned ratio will be referred to as "high μ characteristic ratio (or high μ feature ratio)". The high μ characteristic ratio refers to a ratio of an area of a portion having high μ characteristics in the region of interest to the whole area of that region. In addition, the high μ characteristics are determined based on the color, brightness, roughness, and the like of the image.

The image processing ECU 30 determines the road surface μ state of the lane on which the vehicle SV is traveling based on the high μ characteristic ratios of the regions A to F as described later. Such image processing methods and image analyzing methods are well known (for example, see Japanese Patent Application. Laid-open Nos. 2018-90161 and 2018-95076).

The image processing ECU 30 extracts regions corresponding the lane (own lane) on which the vehicle SV is traveling from among the regions A to E. In the example illustrated in FIG. 2, the regions corresponding the own lane are the region D and the region E. The position and capturing range of the camera 44 are set such that those two regions corresponding to the own lane are included in the front region image 100a.

The image processing ECU 30 determines whether or not a split μ road condition described below is satisfied based on the high μ characteristic ratios of the extracted two regions. Hereinafter, the high μ characteristic ratio in a region X is represented as "X1". For example, the high μ characteristic ratio of the region D is referred to as "high μ characteristic ratio D1", and the high μ characteristic ratio of the region E is referred to as "high μ characteristic ratio E1".

(Split μ road condition): A magnitude (=|D1-E1|) of a difference between the high μ characteristic ratio D1 and the high μ characteristic ratio E1 is larger than a determination threshold Trth.

The image processing ECU 30 distinguishes (determines) whether the road in front of the vehicle SV is the left-and-right uniform μ road or the split μ road based on the determination result of the split μ road condition.

In the case of the front region image 100a in FIG. 2, the split μ road condition is not satisfied. Therefore, the image processing ECU 30 determines that the road in front of the vehicle SV is the left-and-right uniform μ road. As described above, the left-and-right uniform μ road refers to a road which can be considered that there is no difference between the left road surface μ and the right road surface μ. Hereinafter, the difference between the left road surface μ and the right road surface μ will be referred to as a "left-and-right μ difference".

Figure 3:
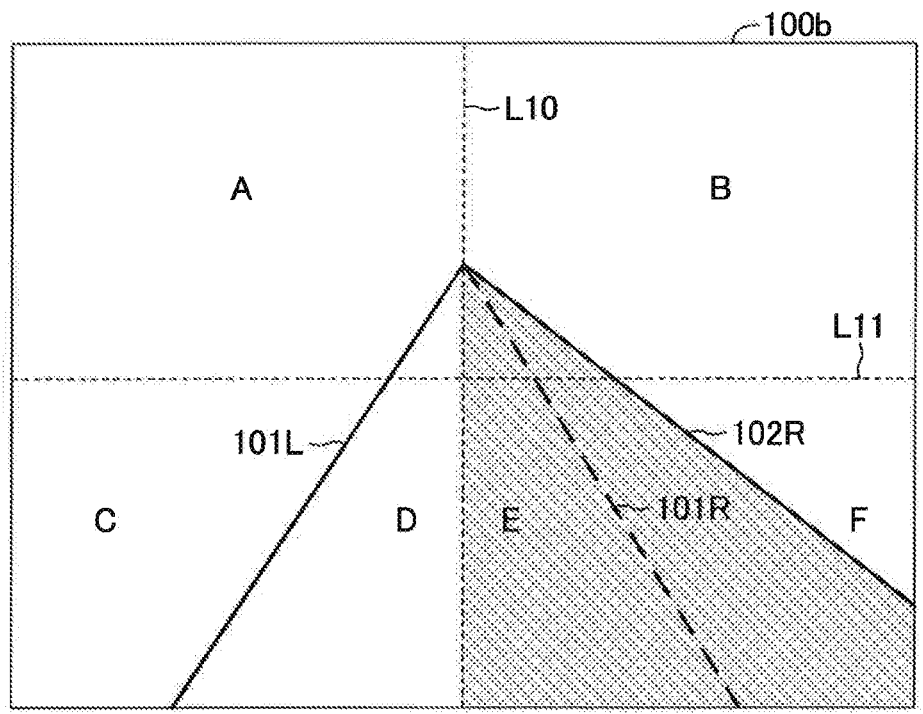
FIG. 3 is a diagram for explaining the method for determining the road surface μ stat e based on the image of the front region of the vehicle.

On the other hand, in the case of a front region image 100b in FIG. 3, the split μ road condition is satisfied. Therefore, the image processing ECU 30 determines that the road in front of the vehicle SV is the split μ road. As described above, the split μ road refers to a road which can be considered that there is the left-and-right μ difference.

The image processing ECU 30 transmits information on the determined road surface μ state of the road in front of the vehicle SV to the brake ECU 20.

<Operation>

Next, the operation of the control apparatus will be described. The CPU (hereinafter, simply referred to as "CPU1") of the image processing ECU 30 is configured to, each time a predetermined time elapses, execute a "road surface μ state determination routine" illustrated in FIG. 4 as a flowchart.

As a predetermined timing arrives, the CPU1 starts the routine of FIG. 4 from Step 400, and executes the processing of Steps 401 and 402 (described below) in sequence. Thereafter, the CPU1 proceeds to Step 403.

(Step 401): The CPU1 acquires the front region image from the camera 44, (Step 402): The CPU1 performs the image processing and the image analyzing on the front region image as described above to calculate the high μ characteristic ratio D1 of the region D and the high μ characteristic ratio E1 of the region E.

As the CPU1 proceeds to Step 403, the CPU1 determines whether or not the above-mentioned split μ road condition is satisfied. When the split μ road condition is satisfied, the CPU1 makes a "Yes" determination in Step 403, and executes the processing of Steps 404 and 406 (described below) in sequence. Thereafter, the CPU1 proceeds to Step 495 to tentatively terminate this routine.

Step 404: The CPU1 sets a value of a first flag Fsp to "1". When the value of the first flag Fsp is "1", this indicates that the road in front of the vehicle SV is the split μ road. Meanwhile, when the value of the first flag Fsp is "0", this indicates that the road in front of the vehicle SV is the left-and-right uniform μ road. In addition, the value of the first flag. Fsp is set to "0" in an initialization routine to be executed when an ignition switch (not shown) is switched from an "OFF" position to an "ON" position.

Step 406: The CPU1 transmits to the brake ECU 20 the information on the road surface μ state of the road in front of the vehicle SV (including the information on the value of the first flag Fsp).

On the other hand, the split μ road condition is not satisfied, the CPU1 makes a "No" determination in Step 403, and proceeds to Step 405 to set the value of the first flag Fsp to "0". Next, in Step 406, the CPU1 transmits to the brake ECU 20 the information on the road surface μ state of the road in front of the vehicle SV (including the information on the value of the first flag Fsp). Thereafter, the CPU1 proceeds to Step 495 to tentatively terminate this routine.

Further, the CPU (hereinafter, simply referred to as "CPU2") of the brake ECU 20 is configured to, each time a predetermined time elapses, execute a "hill-hold control execution routine" illustrated in FIG. 5 as a flowchart. Further, the CPU2 is configured to, each time a predetermined, time elapses, execute a routine (not shown) to acquire the operating state information from the accelerator pedal operation amount sensor 41 and the master cylinder pressure sensor MS, and store the operating state information in the RAM.

In addition, the CPU2 is configured to, each time a predetermined time elapses, execute a routine (not shown) to calculate the target braking forces Fbi based on the master cylinder pressure Fm and store those target braking forces Fbi in the RAM. The CPU2 is configured to control the wheel cylinders 24i such that the braking forces of the wheels Wi match (become equal to) the target braking forces Fbi, respectively.

Figure 5:
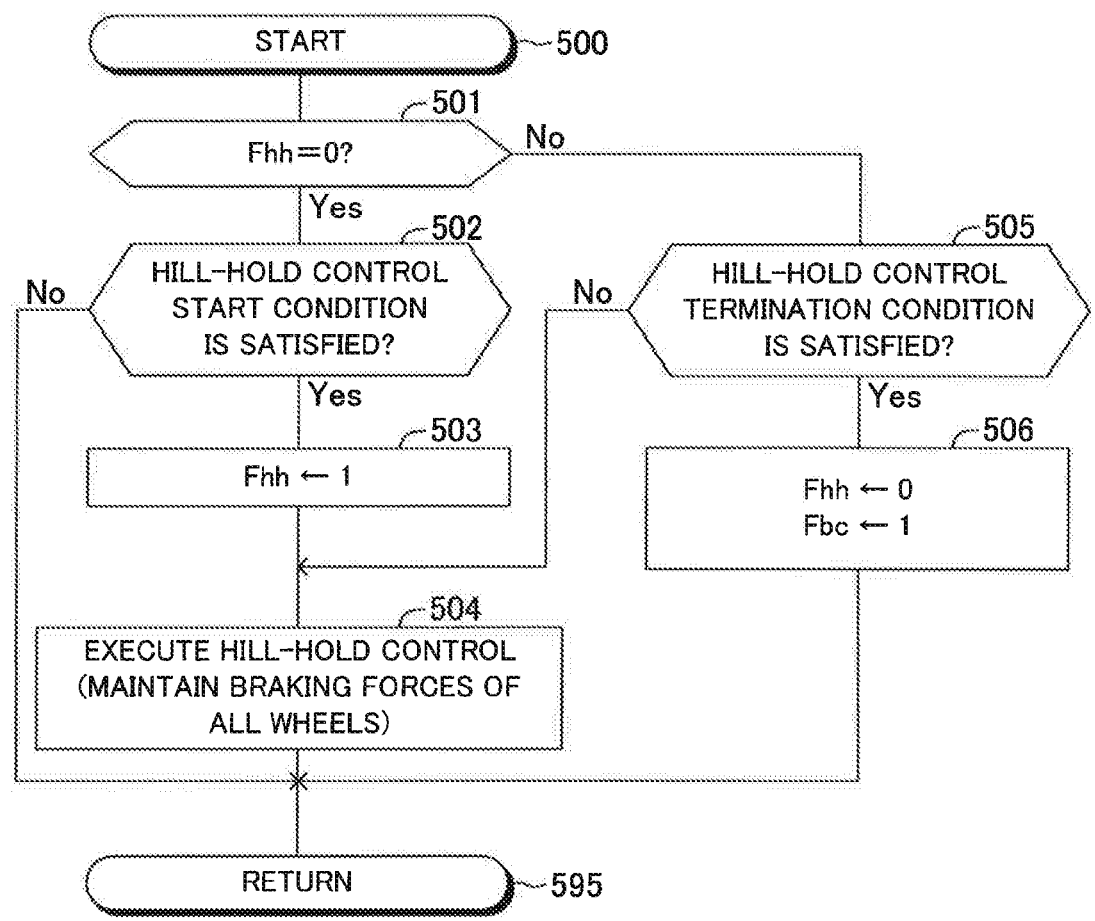
FIG. 5 is a flowchart for illustrating a "hill-hold control execution routine" to be executed by a CPU of a brake ECU illustrated in FIG, 1.

As a predetermined timing arrives, the CPU2 starts the routine of FIG. 5 from Step 500, and proceeds to Step 501 to determine whether or not a value of a second flag Fhh is "0". When the value of the second flag Fhh is "1", this indicates that the hill-hold control is being executed. When the value of the second flag Fhh is "0", this indicates that the hill-hold control is not being executed. The value of the second flag Fhh is set to "0" in the initialization routine. Further, the value of the second flag Fhh is set to "0" in Step 506 as described later.

It is now assumed that the value of the second flag Fhh is "0" (the hill-hold control is not being executed). In this case, the CPU2 makes a "Yes" determination in Step 501, and proceeds to Step 502 to determine whether or not a predetermined hill-hold control start condition (hereinafter, simply referred to as a "start condition") is satisfied, The start condition is satisfied when all of the following conditions A1 to A3 are satisfied.

(Condition A1): The vehicle SV is in a stopped state, That is, all of the wheel speeds Vwi are zero.

(Condition A2): The master cylinder pressure Pm is changed from a value equal to or larger than a predetermined threshold Pmth to a value smaller than the threshold Pmth. That is, the driver stops operating the brake pedal 21.

(Condition A3): Immediately before the Condition A2 is satisfied, a state in which the master cylinder pressure Pm is equal to or larger than the threshold Pmth (that is, state in which the driver depresses the brake pedal 21) has continued for the predetermined period Tpr or longer.

When the start condition is not satisfied, the CPU2 makes a "No" determination in Step 502, and proceeds directly to Step 595 to tentatively terminate this routine, On the other hand, when the start condition is satisfied, the CPU2 makes a "Yes" determination in Step 502, and executes the processing of Steps 503 and 504 (described below) in sequence. Thereafter, the CPU2 proceeds to Step 595 to tentatively terminate this routine, Step 503: The CPU2 sets the value of the second flag Fhh to "1".

Step 504: The CPU2 executes the hill-hold control. Specifically, the CPU2 acquires from the RAM the values of the target braking forces Fbi which were used at a time point immediately before the Condition A2 is satisfied (that is, the driver stops operating the brake pedal 21). The CPU2 sets the target braking forces Fbi to those values acquired from the RAM, respectively. The CPU2 controls the braking pressure for each wheel cylinder 24i such that the braking force of each wheel Wi matches (becomes equal to) the corresponding target braking force Fbi, In this manner, the CPU2 maintains (keeps) the braking forces which were applied to the wheels Wi at the time point immediately before the driver stops operating the brake pedal 21, In addition, when executing the hill-hold control in Step 504, the CPU2 may set all of the target braking forces Fbi to a predetermined value (value sufficient to stop the vehicle SV on any road surface).

After the hill-hold control is started as described above, the CPU2 again starts the routine of FIG. 5 from Step 500, and proceeds to Step 501. The CPU2 makes a "No" determination in Step 501, and proceeds to Step 505. In Step 505, the CPU2 determines whether or not a predetermined hill-hold control termination condition (hereinafter, simply referred to as a "termination condition") is satisfied. The termination condition is satisfied when the operation amount AP of the accelerator pedal becomes equal to or larger than a predetermined threshold APth (that is, the driver starts operating the accelerator pedal 41a).

When the termination condition is not satisfied, the CPU2 makes a "No" determination in Step 505, and proceeds to Step 504 to continue executing the hill-hold control. Thereafter, the CPU2 proceeds to Step 595 to tentatively terminate this routine.

Figure 6:
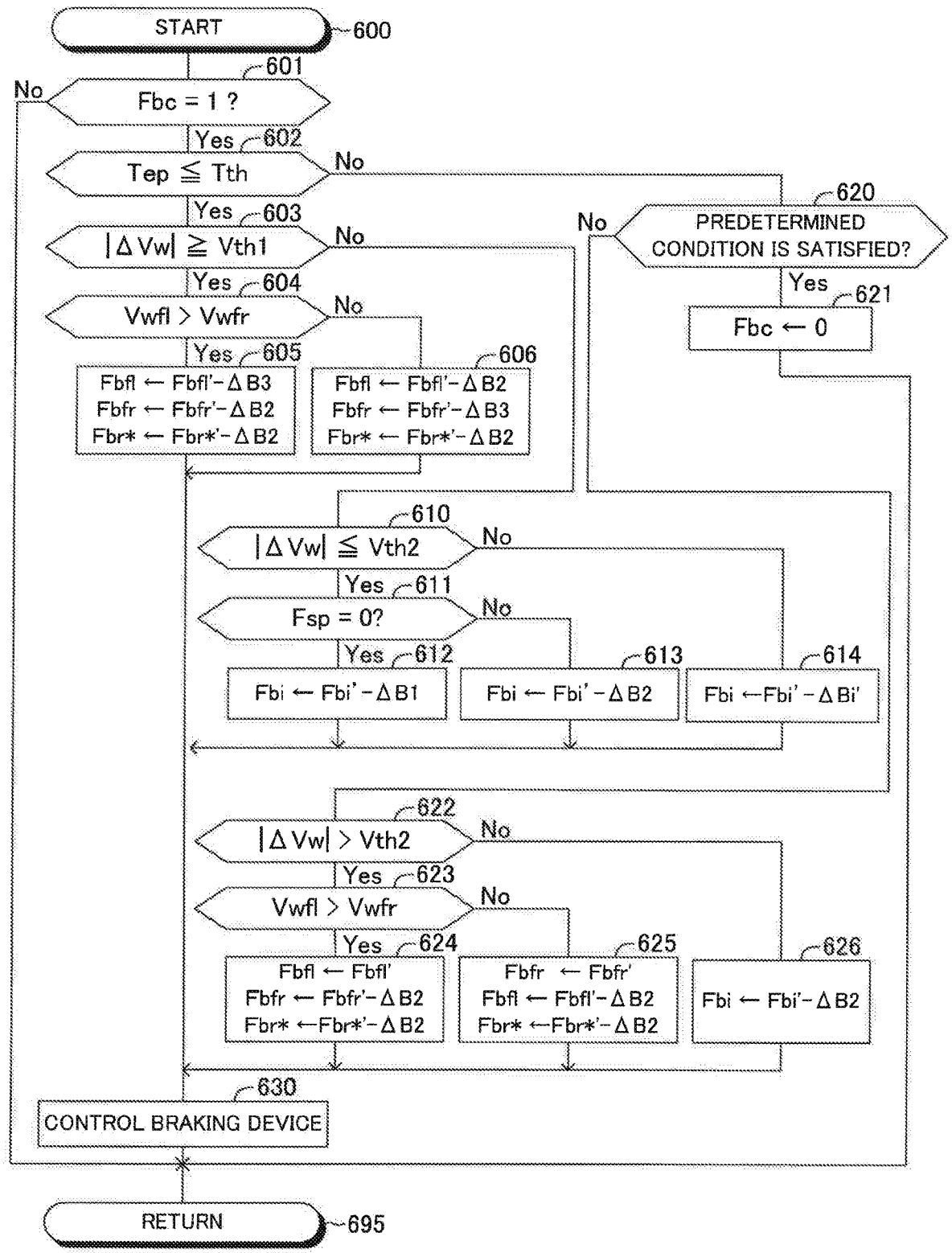
FIG. 6 is a flowchart for illustrating a "braking force cancel control execution routine" to be executed by the CPU of the brake ECU.

On the other hand, when the termination condition is satisfied, the CPU2 makes a "Yes" determination in Step 505, and proceeds to Step 506. In Step 506, the CPU2 sets the value of the second flag Fhh to "0", and sets a value of a third flag Fbc to "1". Thereafter, the CPU2 proceeds to Step 595 to tentatively terminate this routine. Therefore, the hill-hold control is terminated, When the value of the third flag Fbc is "1", this indicates that a "braking force cancel control execution routine" of FIG. 6 (described later) is being executed. When the value of the third flag Fbc is "0", this indicates that the braking force cancel control execution routine of FIG. 6 is terminated. The value of the third flag Fbc is set to "0" in the initialization routine, Further, the value of the third flag Fbc is set to "0" in Step 621 in the routine of FIG. 6 as described later.

The CPU2 is configured to, each time a predetermined time (Δts) elapses, execute the "braking force cancel control execution routine" illustrated in FIG. 6 as a flowchart. Further, the CPU2 is configured to, each time the predetermined time (Δts) elapses, execute a routine (not shown) to calculate the vehicle speed Vwi for each wheel based on the signals from the wheel speed sensors 42 as described above, and store the calculated vehicle speed Vwi for each wheel in the RAM.

Next, the processing of the routine of FIG, 6 will be described for each of the following first to fourth situations.

(First situation): The vehicle SV starts on a slope which is the left-and-right uniform μ road (see FIG, 7).

Figure 8:
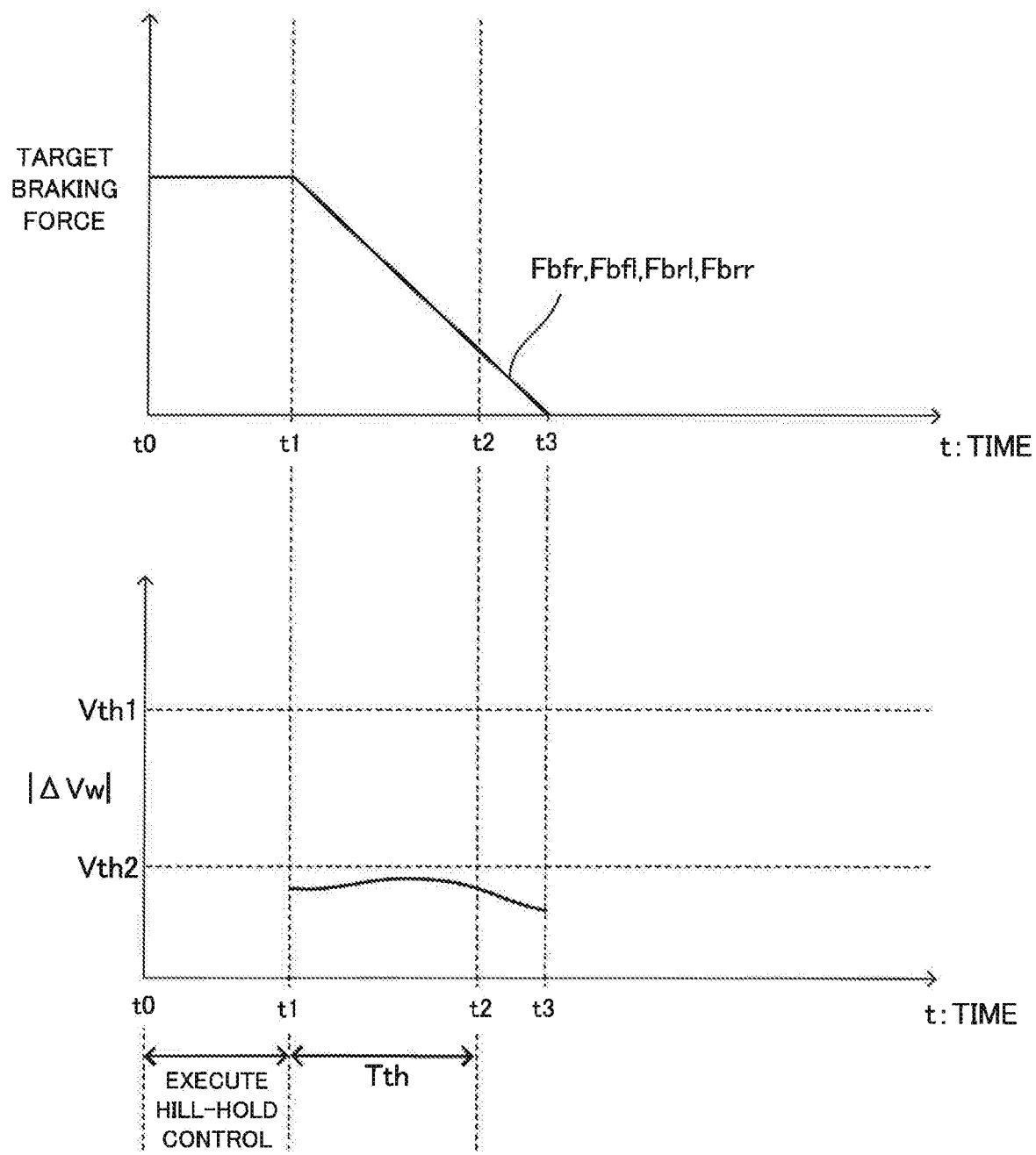
FIG. 8 is a time-series chart for illustrating a behavior of the vehicle when the control apparatus executes the hill-hold control and the braking force cancel control in a situation in which the vehicle starts on a slope which is a "split μ road".

(Second situation): The vehicle SV starts on a slope which is the split μ road having a relatively small left-and-right μ difference (see FIG. 8). In addition, the left road surface μ is smaller than the right road surface μ.

(Third situation): The vehicle SV starts on a slope which is the split μ road having a relatively large left-and-right μ difference (see FIG. 9). In addition, the left road surface μ is smaller than the right road surface μ.

(Fourth situation): The vehicle SV starts on a slope which is the split μ road having a relatively large left-and-right μ difference (see FIG. 10), In addition, the right road surface μ is smaller than the left road surface μ.

(First situation: Left-and-Right Uniform μ Road)

Figure 7:
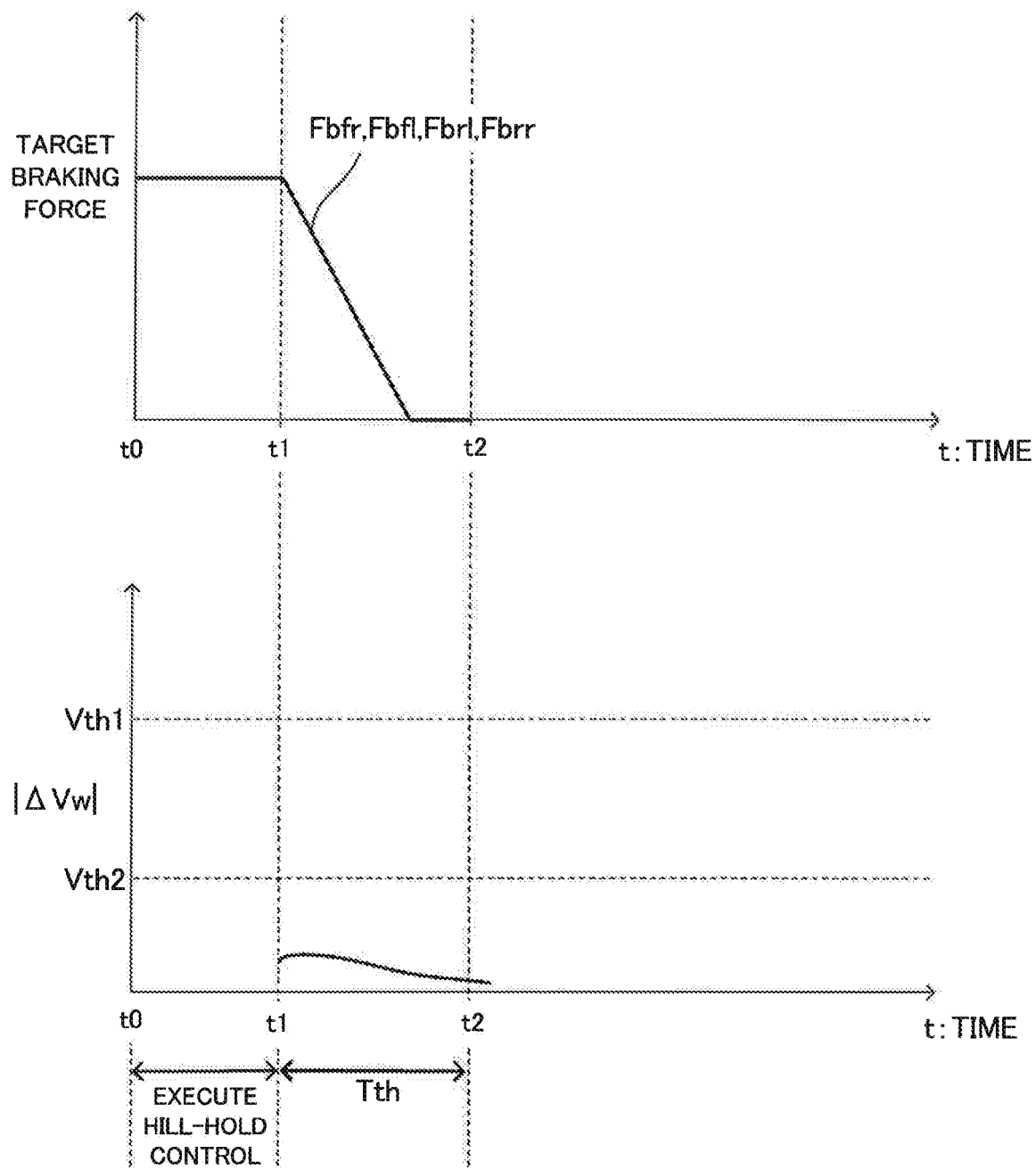
FIG. 7 is a time-series chart for illustrating a behavior of the vehicle when the control apparatus executes the hill-hold control and the braking force cancel control in a situation in which the vehicle starts on a slope which is a "left-and-right uniform μ road".

In an example illustrated in FIG. 7, before a time point t0, the driver depresses the brake pedal 21 to stop the vehicle SV. At the time point t0, the driver stops operating the brake pedal 21. Thus, the CPU2 starts the hill-hold control (see Steps 502 to 504 in the routine of FIG. 5). As described above, the CPU2 acquires from the RAM the values of the target braking forces Fbi which were used at a time point immediately before the driver stops operating the brake pedal 21 (time point t0). The CPU2 sets the current target braking forces Fbi to those values acquired from the RAM, respectively. The CPU2 controls the braking pressures of the wheel cylinders 24i such that the braking force of each wheel Wi matches (becomes equal to) the corresponding target braking force Fbi. Thereafter, the driver starts operating the accelerator pedal 41a at a time point t1. Thus, the CPU2 terminates the hill-hold control at the time point t1 (see Steps 505 and 506 in the routine of FIG. 5).

In the above-mentioned situation, at the time point t1, the CPU2 starts the routine of FIG. 6 from Step 600, The CPU2 proceeds to Step 601 to determine whether or not the value of the third flag Fbc is "1". Since the hill-hold control is terminated, the value of the third flag Fbc is "1" at the current time point. The CPU2 makes a "Yes" determination in Step 601, and proceeds to Step 602. In Step 602, the CPU2 determines whether or not an elapsed time Tep since the time point at which the third flag Fbc is set to "1" in Step 606 in the routine of FIG. 5 is equal to or shorter than a predetermined time threshold Tth. The elapsed time Tep refers to an elapsed time since the termination of the hill-hold control. In other words, the elapsed time Tep is an elapsed time from the start of the braking force cancel control.

At the time point t1, the elapsed time Tep is shorter than the time threshold Tth. Thus, the CPU2 makes a "Yes" determination in Step 602, and proceeds to Step 603. In Step 603, the CPU2 calculates a vehicle speed difference ΔVw (=Vwfl−Vwfr). Further, the CPU determines whether or not an absolute value (|ΔVw|) of the vehicle speed difference ΔVw is equal to or larger than a predetermined first threshold Vth1. The first threshold Vth1 is smaller than the TRC start threshold Th_trc.

At the time point t1, the absolute value of he vehicle speed difference ΔVw is smaller than the first threshold Vth1. The CPU2 makes a "No" determination in Step 603, and proceeds to Step 610. In Step 610, the CPU2 determines whether or not the absolute value of the vehicle speed difference ΔVw is equal to or smaller than a predetermined second threshold Vth2, The second threshold Vth2 is smaller than the first threshold Vth1 (Vth2<Vth1). Since the absolute value of the vehicle speed difference ΔVw is smaller than the second threshold Vth2 at the current time point, the CPU2 makes a "Yes" determination in Step 610, and proceeds to Step 611 to determine whether or not the value of the first flag Fsp is "0".

Figure 4:
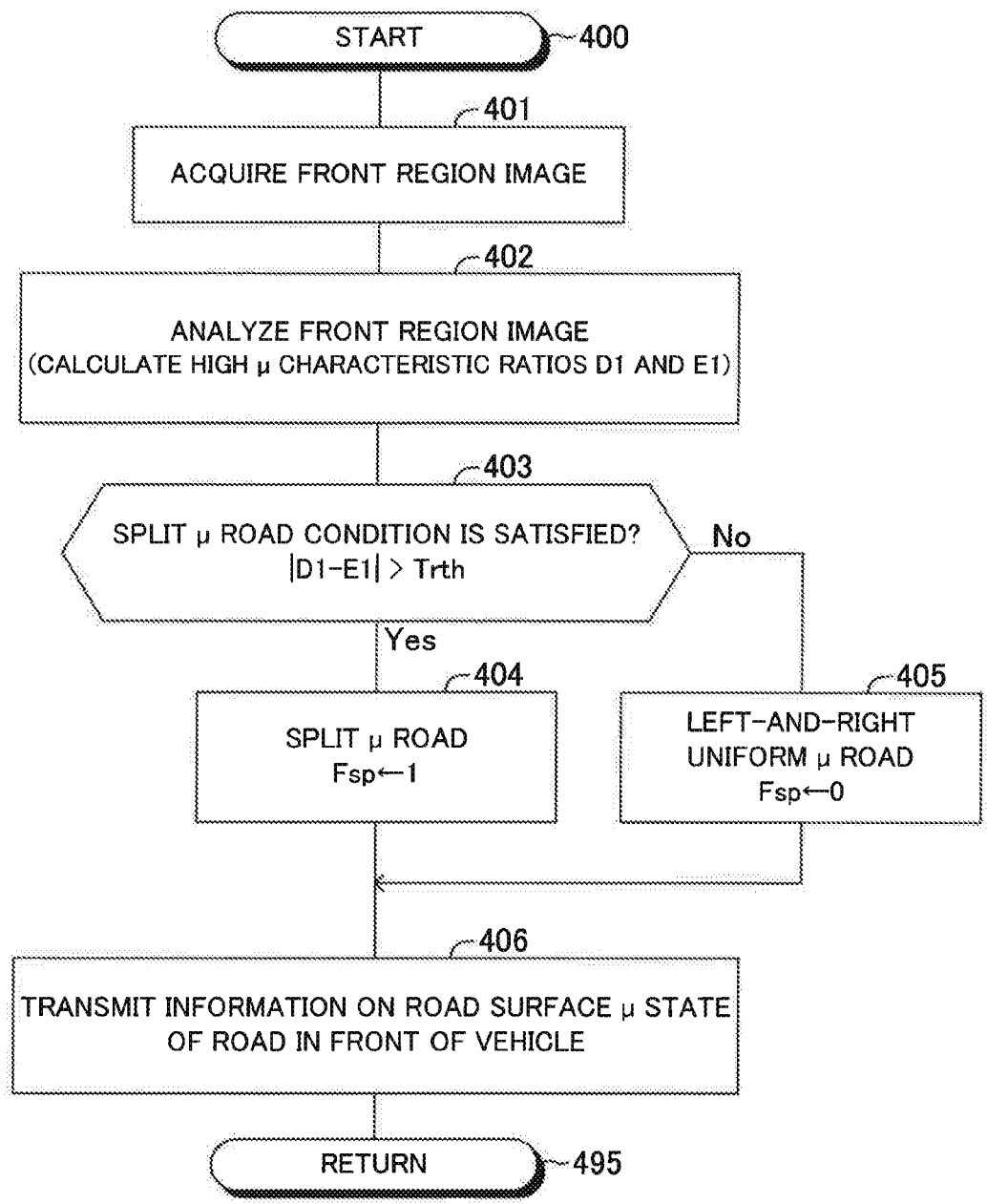
FIG. 4 is a flowchart for illustrating a "road surface μ state determination routine" to be executed by a CPU of an image processing ECU illustrated in FIG. 1.

In the first situation, since the road in front of the vehicle SV is the left-and-right uniform μ road, the value of the first flag Fsp is "0" (see Step 405 in the routine of FIG. 4). Thus, the CPU2 makes a "Yes" determination in Step 611, and proceeds to Step 612.

In Step 612, the CPU2 acquires the previous target braking forces Fbi" from the RAM. Here, the single quotation mark represents information previously stored in the RAM. That is, the single quotation mark represents information used at the previous time. The target braking forces Fbi' acquired from the RAM at the current time point correspond to the target braking forces Fbi which were used in Step 504 in the routine of FIG, 5, respectively.

For each wheel, the CPU2 obtains a value calculated by subtracting a predetermined first reduction amount ΔB1 from the target braking force Fbi', and sets the target braking force Fbi to the calculated value "Fbi'−ΔB1". The first reduction amount ΔB1 is a predetermined positive value, and is larger than a second reduction amount ΔB2 described later which is a positive value. When the target braking force Fbi<0, the CPU2 sets the target braking force Fbi to "0". The CPU2 stores information on the target braking forces Fbi of all the wheels in the RAM. When the CPU2 stores the target braking forces Fbi in the RAM, the CPU2 also stores in the RAM information on the reduction amounts ΔBi (i="fl", "fr", "rl", and "rr") used this time for calculating the target braking forces Fbi. In this case, the reduction amounts ΔBi (i="fl", "fr", "rl", and "rr") are ΔB1, respectively.

Next, in Step 630, the CPU2 controls the braking pressure for each wheel cylinder 24i such that the braking force of each wheel Wi matches (becomes equal to) the corresponding target braking force Fbi. Thereafter, the CPU2 proceeds to Step 695 to tentatively terminate this routine.

The CPU2 repeatedly executes the above processing each time the predetermined time (Δts) elapses to thereby decrease the braking pressure of the wheel cylinder 24i corresponding to each wheel Wi by the first reduction amount ΔB1. Thus, the braking pressures of all the wheels are decreased rapidly. As a result, the braking pressures of the wheel cylinders become zero.

A time point t2 is a time point immediately after the elapsed time Tep becomes longer than the time threshold Tth. At the time point t2, the CPU2 starts the routine of FIG. 6 from Step 600, and proceeds to Step 602, The CPU2 makes a "No" determination in Step 602, and proceeds to Step 620.

In Step 620, the CPU2 determines whether or not a predetermined condition is satisfied, This condition is satisfied when the target braking forces Fbi of all the wheels are zero. Now, since the target braking forces Fbi of all the wheels are zero, the CPU2 makes a "Yes" determination in Step 620, and proceeds to Step 621. In Step 621, the CPU2 sets the value of the third flag Fbc to "0". Thereafter, the CPU2 proceeds to Step 695 to tentatively terminate this routine. When the CPU2 again starts the routine of FIG. 6 and proceeds to Step 601, the CPU2 makes a "No" determination in Step 601 and proceeds directly to Step 695. Therefore, the braking force cancel control is terminated.

In this manner, when the control apparatus determines that the road in front of the vehicle SV is the left-arid-right uniform μ road, the control apparatus decreases the braking forces of all the wheels Wi with a relatively large change amount in the braking force cancel control.

(Second situation: split μ road having a relatively small left-and-right μ difference in which the left road surface μ is smaller than the right road surface μ)

In an example illustrated in FIG, 8, the situation up to the time point t1 is the same as the example illustrated in FIG, 7, and therefore, the description is omitted. At the time point t1 the CPU2 starts the routine of FIG. 6 from Step 600, and proceeds to Step 601. In this case, since the value of the third flag Fbc is "1", the CPU2 makes a "Yes" determination in Step 601, and proceeds to Step 602.

At the time point t1, the elapsed time Tep is shorter than the time threshold Tth. Thus, the CPU2 makes a "Yes" determination in Step 602, and proceeds to Step 603.

At the time point t1, the absolute value of the vehicle speed difference ΔVw is smaller than the first threshold Vth1. The CPU2 makes a "No" determination in Step 603, and proceeds to Step 610. Further, the absolute value of the vehicle speed difference ΔVw is smaller than the second threshold Vth2, and thus, the CPU2 makes a "Yes" determination in Step 610, and proceeds to Step 611.

In the second situation, since the road in front of the vehicle SV is the split μ road, the first flag Fsp is "1" (see Step 404 in the routine of FIG. 4). The CPU2 makes a "No" determination in Step 611, and proceeds to Step 613.

In Step 613, the CPU2 acquires the target braking forces Fbi' from the M. The target braking forces Fbi' acquired from the RAM at the current time point correspond to the target braking forces Fbi which were used in Step 504 in the routine of FIG. 5, respectively. For each wheel, the CPU2 obtains a value calculated by subtracting the predetermined second reduction amount DB2 from the target braking force Fbi', and sets the target braking force Fbi to the calculated value "Fbi'-ΔB2", The second reduction amount ΔB2 is a predetermined positive value, and is smaller than the first reduction amount ΔB1. In this manner, when the value of the first flag Fsp is "1" (that is, the road in front of the vehicle SV is the split μ road), the amount of reduction in the target braking force Fbi per the predetermined time (Δts) is smaller than that of when the road in front of the vehicle SV is the left-and-right uniform μ road. The CPU2 stores in the RAM information on the target braking forces Fbi, and information on the reduction amounts ΔBi used this time.

Next, the CPU2 executes the processing of Step 630 as described above. Thereafter, the CPU2 proceeds to Step 695 to tentatively terminate this routine.

The CPU2 repeatedly executes the above processing each time the predetermined time (Δts) elapses to thereby decrease the braking pressure of the wheel cylinder 24i corresponding to each wheel WI by the second reduction amount ΔB2. Thus, the braking pressures of all the wheels are gradually (slowly) decreased. At the time point t2, the CPU2 starts the routine of FIG. 6 from Step 600, and proceeds to Step 602. Since the elapsed time Tep becomes longer than the time threshold Tth, the CPU2 makes a "No" determination in Step 602, and proceeds to Step 620. At this time point, the target braking forces. Fbi of all the wheels have not yet become zero. Thus, the CPU2 makes a "No" determination in Step 620, and proceeds to Step 622.

In Step 622, the CPU2 determines whether or not the absolute value of the vehicle speed difference ΔVw becomes larger than the second threshold Vth2. At this time point, the absolute value of the vehicle speed difference ΔVw is not larger than the second threshold Vth2, and therefore, the CPU2 makes a "No" determination in Step 622, and proceeds to Step 626.

In Step 626, the CPU2 sets the target braking force Fbi to "Fbi'-ΔB2" for each wheel Wi in the same way as the processing of Step 613. When the target braking force Fbi<0, the CPU2 sets the target braking force Fbi to "0". The CPU2 stores in the RAM information on the target braking forces Fbi, and information on the reduction amounts ΔBi used this time.

Next, the CPU2 executes the processing of Step 630 as described above and then, proceeds to Step 695 to tentatively terminate this routine.

The CPU2 repeatedly executes the above processing. Therefore, the braking pressure of the wheel cylinder 24i corresponding to each wheel Wi finally becomes zero. At a time point t3, the CPU2 starts the routine of FIG. 6 from Step 600, and proceeds to Step 620. All of the target braking forces Fbi are zero, and therefore, the CPU2 makes a "Yes" determination in Step 620, and proceeds to Step 621. In Step 621, the CPU2 sets the value of the third flag Fbc to "0", Thereafter, the CPU2 proceeds to Step 695 to tentatively terminate this routine. When the CPU2 again starts the routine of FIG. 6 and proceeds to Step 601, the CPU2 makes a "No" determination in Step 601 and proceeds directly to Step 695. Therefore, the braking force cancel control is terminated.

In this manner, when the control apparatus determines that the road in front of the vehicle SV is the split μ road, the control apparatus decreases the braking forces of all the wheels Wi such that the amount (ΔB2) of reduction in the braking force per unit time (e.g., Δts) becomes smaller than the amount (ΔB1) of reduction in the braking force per unit time when the road in front of the vehicle SV is the left-and-right uniform μ road. Therefore, the drive wheels Wf* are rotated gradually without being rotated rapidly. The slip of the left front wheel Wfl on the road surface side having the lower friction coefficient μ is avoided, and the left front wheel Wfl can easily grip the road surface of the split μ road. Furthermore, the driving force of the right front wheel Wfr on the road surface side having the higher friction coefficient μ is gradually transmitted to the road surface. According to the present embodiment, the control apparatus can reduce the possibility that the vehicle SV moves backward when the vehicle SV starts on the slope which is the split μ road.

(Third situation: split μ road having a relatively large left-and-right μ difference in which the left road surface μ is smaller than the right road surface μ)

Figure 9:
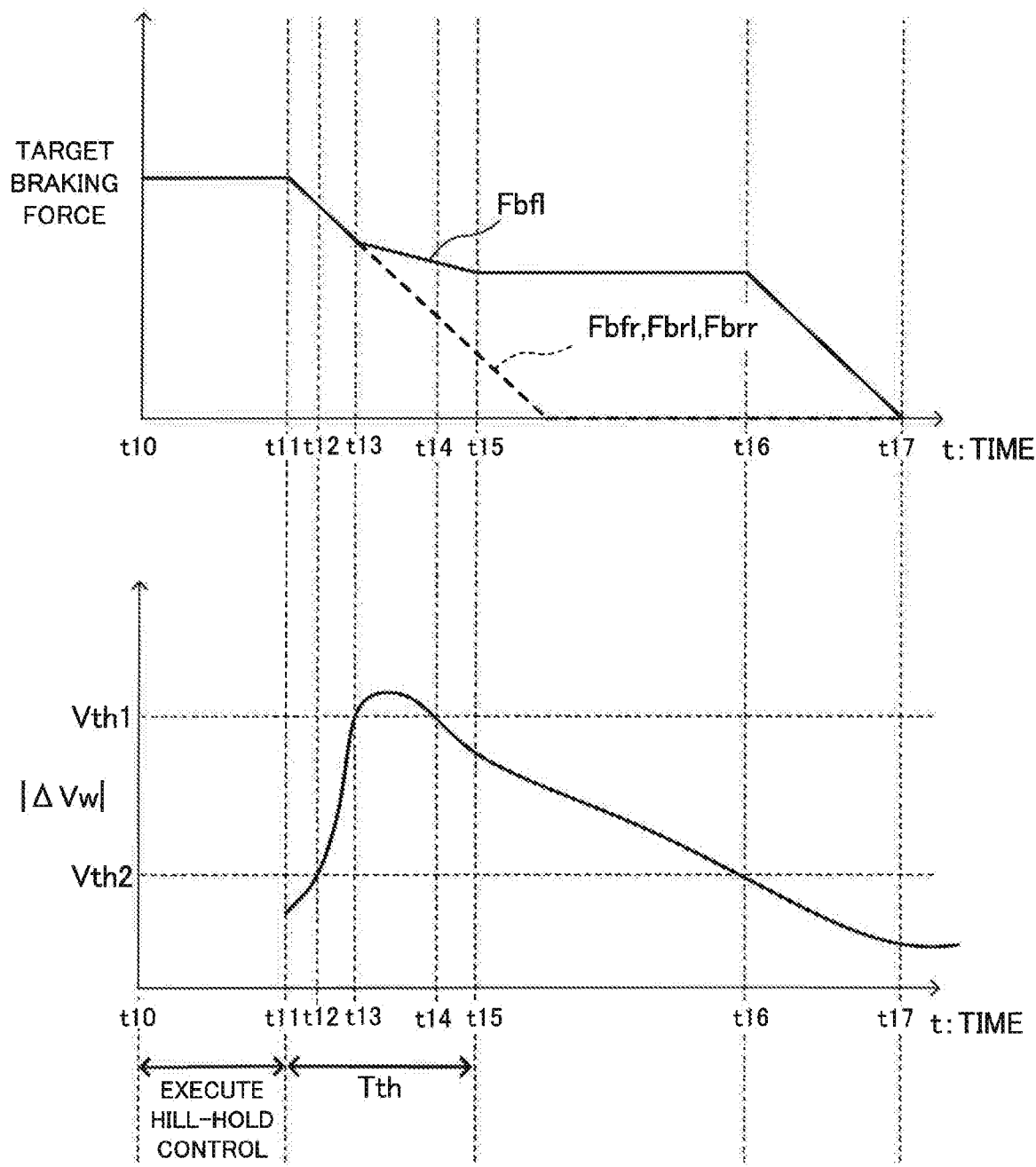
FIG. 9 is a time-series chart for illustrating a behavior of the vehicle when the control apparatus executes the hill-hold control and the braking force cancel control in a situation in which the vehicle starts on a slope which is a "split μ road".

In an example illustrated, in FIG. 9, before a time point t10, the driver depresses the brake pedal 21 to stop the vehicle SV. At the time point t10, the driver stops operating the brake pedal 21. Thus, the CPU2 starts the hill-hold control (see Steps 502 to 504 in the routine of FIG. 5). Thereafter, the driver starts operating the accelerator pedal 41a at a time point t11. The CPU2 terminates the hill-hold control at the time point t11 (see Steps 505 and 506 in the routine of FIG. 5).

In the above-mentioned situation, at the time point t11, the CPU2 starts the routine of FIG. 6 from Step 600, and proceeds to Step 601. In this case, since the value of the third flag Fbc is "1", the CPU2 makes a "Yes" determination in Step 601, and proceeds to Step 602.

At the time point t11, the elapsed time Tep is shorter than the time threshold Tth. Thus, the CPU2 makes a "Yes" determination in Step 602, and proceeds to Step 603.

At the time point t11, the absolute value of the vehicle speed difference ΔVw is smaller than the first threshold Vth1. The CPU2 makes a "No" determination in Step 603, and proceeds to Step 610. Further, the absolute value of the vehicle speed difference ΔVw is smaller than the second threshold Vth2. The CPU2 makes a "Yes" determination in Step 610, and proceeds to Step 611.

In the third situation, since the road in front of the vehicle SV is the split μ road, the first flag Fsp is "1" (see Step 404 in the routine of FIG. 4). Thus, the CPU2 makes a "No" determination in Step 611, and proceeds to Step 613. In Step 613, the CPU2 sets the target braking force Fbi to "Fbi'-ΔB2" for each wheel Wi as described above. The CPU2 stores in the RAM information on the target braking forces Fbi, and information on the reduction amounts ΔBi (in this case, ΔB2) used this time.

Next, the CPU2 executes the processing of Step 630 as described above, and then, proceeds to Step 695 to tentatively terminate this routine.

The CPU2 repeatedly executes the above processing each time the predetermined time (Δts) elapses to thereby decrease the braking pressure of the wheel cylinder 24$i$ corresponding to each wheel Wi by the second reduction amount ΔB2. Thus, the braking pressures of all the wheels are gradually decreased. At a time point t12, the CPU2 starts the routine of FIG. 6 from Step 600, and proceeds to Step 610. Since the absolute value of the vehicle speed difference ΔVw is larger than the second threshold Vth2, the CPU2 makes a "No" determination in Step 610, and proceeds to Step 614.

In Step 614, the CPU2 acquires the previous target braking forces Fbi' and the previous reduction amounts ΔBi' from the RAM. For each wheel Wi, the CPU2 obtains a value calculated by subtracting the reduction amount ΔBi' from the target braking force Fbi', and sets the target braking force Fbi to the calculated value "Fbi'-ΔBi'". At this time point, all of the reduction amounts ΔBi' are "ΔB2". Thus, the CPU2 sets the target braking force Fbi to the value "Fbi'-ΔB2" for each wheel Wi. The CPU2 stores in the RAM information on the target braking forces Fbi, and information on the reduction amounts ΔBi used this time.

Next, the CPU2 executes the processing of Step 630 as described above, and then, proceeds to Step 695 to tentatively terminate this routine.

The CPU2 repeatedly executes the above processing each time the predetermined time (Δts) elapses to thereby further decrease the braking pressure of the wheel cylinder 24$i$ corresponding to each wheel Wi. In the third situation, the left-and-right μ difference is relatively large, and therefore, the wheel speed Vwfl of the left front wheel Wfl becomes rapidly larger than the wheel speed Vwfr of the right front wheel Wfr. As a result, the absolute value of the vehicle speed difference ΔVw becomes large rapidly as illustrated in FIG. 9.

At a time point t13, the CPU2 again starts the routine of FIG. 6, and proceeds to Step 603. Since the absolute value of the vehicle speed difference ΔVw is equal to or larger than the first threshold Vth1, the CPU2 makes a "Yes" determination in Step 603, and proceeds to Step 604. In Step 604, the CPU2 determines whether or not the wheel speed Vwfl is higher than the wheel speed Vwfr.

Now, the wheel speed Vwfl is higher than the wheel speed Vwfr. Thus, the CPU2 makes a "Yes" determination in Step 604, and proceeds to Step 605.

In Step 605, the CPU2 acquires the previous target braking forces Fbi' from the RAM. The CPU2 obtains a value calculated by subtracting a predetermined third reduction amount ΔB3 from the target braking force Fbfl', and sets the target braking force Fbfl to the calculated value "Fbfl'-ΔB3". The third reduction amount ΔB3 is a predetermined positive value, and is smaller than the second reduction amount ΔB2. Meanwhile, the CPU2 sets the target braking force Fbfr to a value "Fbfr'-ΔB2". Further, the CPU2 sets the target braking force Fbr* to a value "Fbr*'-ΔB2" for each rear wheel Wr*. The CPU2 stores in the RAM information on the target braking forces Fbi, and information on the reduction amounts ΔBi used this time.

Next, the CPU2 executes the processing of Step 630 as described above, and then, proceeds to Step 695 to tentatively terminate this routine.

The CPU2 executes the above processing each time the predetermined time (Δts) elapses to thereby decrease the target braking force Fbfl corresponding to the drive wheel (left front wheel Wfl) which is in contact with the left road surface having the lower friction coefficient μ as follows. Specifically, the amount (ΔB3) of reduction per unit time (Δts) in the target braking force Fbfl becomes smaller than the amount (ΔB2) of reduction per unit time (Δts) in the target braking forces (Fbfr, Fbrl and Fbrr) of the other wheels (Wfr, Wrl and Wrr). Therefore, the braking pressure of the wheel cylinder 24$fl$ corresponding to the left front wheel Wfl becomes larger than the braking pressures of the wheel cylinders (24$fr$, 24$rl$ and 24$rr$) corresponding to the other wheels (Wfr, Wrl and Wrr). Accordingly, it is possible to suppress the slip of the left front wheel Wfl as the drive wheel. After the time point t13, the absolute value of the vehicle speed difference ΔVw changes from an upward trend to a downward trend.

At a time point t14, the CPU2 starts the routine of FIG. 6 from Step 600, and proceeds to Step 603. Since the absolute value of the vehicle speed difference ΔVw is smaller than the first threshold Vth1, the CPU2 makes a "No" determination in Step 603, and proceeds to Step 610. Further, the absolute value of the vehicle speed difference ΔVw is larger than the second threshold Vth2, and thus, the CPU2 makes a "No" determination in Step 610, and proceeds to Step 614.

In Step 614, for each wheel Wi, the CPU2 obtains a value calculated by subtracting the reduction amount ΔBi' from the target braking force Fbi', and sets the target braking force Fbi to the calculated value "Fbi'-ΔBi'". In this case, the reduction amount ΔBfl' previously used for the target braking force Fbfl is "ΔB3". Thus, the CPU2 sets the target braking force Fbfl to a value "Fbfl'-ΔB3". Meanwhile, the reduction amounts (ΔBfr', ΔBrl' and ΔBrr') previously used for the other target braking forces (Fbfr, Fbrl and Fbrr) are "ΔB2". Thus, the CPU2 sets the target braking force Fbfr to a value "Fbfr'-ΔB2". Further, the CPU2 sets the target braking force Fbr* to a value "Fbr*'-ΔB2" for each rear wheel Wr*. The CPU2 stores in the RAM information on the target braking forces Fbi, and information on the reduction amounts ΔBi used this time.

Next, the CPU2 executes the processing of Step 630 as described above, and then, proceeds, to Step 695 to tentatively terminate this routine, in this manner, the CPU2 continues executing the above processing, such that the amount (ΔB3) of reduction per unit time in the target braking force Fbfl corresponding to the left front wheel Wfl becomes smaller than the amount (ΔB2) of reduction per unit time in the target braking forces (Fbfr, Fbrl and Fbrr) corresponding to the other wheels (Wfr, Wrl and Wrr). Therefore, it is possible to suppress the slip of the left front wheel Wfl.

A time point t15 is a time point immediately after the elapsed time Tep becomes longer than the time threshold Tth. At the time point t15, the CPU2 starts the routine of FIG. 6 from Step 600, and proceeds to Step 602. The CPU2 makes a "No" determination in Step 602, and proceeds to Step 620.

The target braking forces Fbi of all the wheels have not yet become zero at this time point. Thus, the CPU2 makes a "No" determination in Step 620, and proceeds to Step 622. Since the absolute value of the vehicle speed difference ΔVw is larger than the second threshold Vth2, the CPU2 makes a "Yes" determination in Step 622, and proceeds to Step 623.

In Step 623, the CPU2 determines whether or not the wheel speed Vwfl is higher than the wheel speed Vwfr. Since the wheel speed Vwfl is higher than the wheel speed Vwfr at the time point t15, the CPU2 makes a "Yes" determination in Step 623, and proceeds to Step 624.

In Step 624, the CPU2 acquires the previous target braking forces Fbi' from the RAM. The CPU2 sets the target braking force Fbfl to the previous target braking force Fbfl'. In this manner, for the left front wheel Wfl, the target braking force Fbfl is maintained at the previous target braking force Fbfl'. Further, the CPU2 sets the target braking force Fbfr to a value "Fbfr'-ΔB2". In addition, for each rear wheel, the CPU2 sets the target braking force Fbr* to a value "Fbr*'-ΔB2". When the target braking force Fbfr<0, the CPU2 sets the target braking force Fbfr to "0". When the target braking force Fbr'<0, the CPU2 sets the target braking force Fbr* to "0". The CPU2 stores in the RAM information on the target braking forces Fbi, and information on the reduction amounts ΔBi used this time.

Next, the CPU2 executes the processing of Step 630 as described above, and then, proceeds to Step 695 to tentatively terminate this routine.

By executing the above processing, the braking pressure of the wheel cylinder 24fl corresponding to the left front wheel Wfl is maintained (kept), and the braking pressures of the wheel cylinders (24fr, 24rl and 24rr) corresponding to the other wheels (Wfr, Wrl and Wrr) are gradually decreased to thereby become zero finally. Therefore, while suppressing the slip of the left front wheel Wfl, the braking force applied to the right front wheel Wfr is cancelled, and the driving force of the right front wheel Wfr is transmitted to the road surface. As a result, the vehicle SV can start on the slope which is the split μ road without moving backward.

At a time point t16, the CPU2 starts the routine of FIG. 6 from Step 600, and proceeds to Step 622. Since the absolute value of the vehicle speed difference ΔVw is equal to or smaller than the second threshold Vth2, the CPU2 makes a "No" determination in Step 622, and proceeds to Step 626.

In Step 626, the CPU2 sets the target braking force Fbi to a value "Fbi'ΔB2" for each wheel. At this time point, the target braking forces Fbfr, Fbrl and Fbrr are already zero. Therefore, the CPU2 sets the target braking force Fbfl to a value "Fbfl'-ΔB2". When the target braking force Fbfl<0, the CPU2 sets the target braking force Fbfl to "0."

Next, the CPU2 executes the processing of Step 630 as described above, and then, proceeds to Step 695 to tentatively terminate this routine.

By repeatedly executing the above processing, the braking pressure of the wheel cylinder 24fl corresponding to the left front wheel Wfl is decreased to thereby become zero finally. At a time point t17, the CPU2 starts the routine of FIG. 6 from Step 600, and proceeds to Step 620. At this time point, the target braking forces Fbi of all the wheels are zero. Thus, the CPU2 makes a "Yes" determination in Step 620, and proceeds to Step 621. In Step 621, the CPU2 sets the values of the third flag Fbc to "0". Thereafter, the CPU2 proceeds to Step 695 to tentatively terminate this routine. When the CPU2 again starts the routine of FIG. 6 and proceeds to Step 601, the CPU2 makes a "No" determination in Step 601, and proceeds directly to Step 695. Therefore, the braking force cancel control is terminated.

In this manner, when the absolute value of the vehicle speed difference ΔVw is equal to or larger than the first threshold Vth1, the control apparatus decreases the braking force applied to the left front wheel Wfl which is the drive wheel having the higher wheel speed among the drive wheels Wfl and Wfr as follows. Specifically, the amount (ΔB3) of reduction per unit time (Δts) in the braking force applied to the left front wheel Wfl becomes smaller than the amount (ΔB2) of reduction per unit time (Δts) in the braking forces applied to the other wheels (Wfr, Wrl and Wrr). The control apparatus, decreases the braking force for each wheel Wi while applying to the left front wheel Wfl having the higher wheel speed the braking force larger than that applied to the right front wheel Wfr. Accordingly, the control apparatus can suppress the slip of the left front wheel Wfl which is in contact with the left road surface having the lower friction coefficient μ.

Further, at the time point t13, the reference speed (e.g., an estimated vehicle body speed) Va in Expression (2) is substantially zero, and therefore, the slip amount SAfl of the left front wheel Wfl is substantially equal to the wheel speed Vwfl of the left front wheel Wfl, On the other hand, at the time point t13, the right front wheel Wfr which is in contact with the right road surface with the higher friction coefficient μ is not slipping, and the target braking force Fbfr of the right front wheel Wfr is also relatively high. Thus, the wheel speed Vwfr of the right front wheel Wfr is zero (or a value close to zero). As a result, at the time point t13, the absolute value of the vehicle speed difference ΔVw is substantially equal to the wheel speed Vwfl of the left front wheel Wfl. The first threshold Vth1 is smaller than the TRC start threshold Th_trc. From the above, in a situation in which only the left front wheel Wfl is rotating on the road surface (time point t13), the absolute value of the wheel speed difference ΔVw becomes equal to or larger than the first threshold Vth1 before the slip amount SAfl of the left front wheel Wfl reaches the TRC start threshold Th_trc. Therefore, before executing the TRC, the control apparatus can apply to the left front wheel Wfl having the higher wheel speed the braking force larger than that applied to the right front wheel Wfr. The control apparatus can suppress the slip of the left front wheel Wfl without executing the TRC.

Further, on and after the elapsed time Tep since the time point at which the braking force cancel control is started (the third flag Fbc is set to "1") becomes longer than the time threshold Tth, when the absolute value of the vehicle speed difference ΔVw is larger than the second threshold Vth2, the control apparatus maintains the braking force of the left front wheel Wfl, and decreases the braking forces of the wheels (Wfr, Wrl and Wrr) other than the left front wheel Wfl. The braking force of the right front wheel Wfr is gradually cancelled while suppressing the slip of the left front wheel Wfl, and therefore, the driving force of the right front wheel Wfr is transmitted to the road surface. As a result, the vehicle SV can start on the slope which is the split μ road without moving backward.

Furthermore, on and after the elapsed time Tep since the time point at which the braking force cancel control is started becomes longer than the time threshold Tth, when the absolute value of the vehicle speed difference ΔVw is equal to or smaller than the second threshold Vth2, the control apparatus decreases the braking forces of all the wheel Wi by the same change amount (ΔB2).

(Fourth situation: split μ road having a relatively large left-and-right μ difference in which the right road surface μ is smaller than the left road surface μ)

Figure 10:
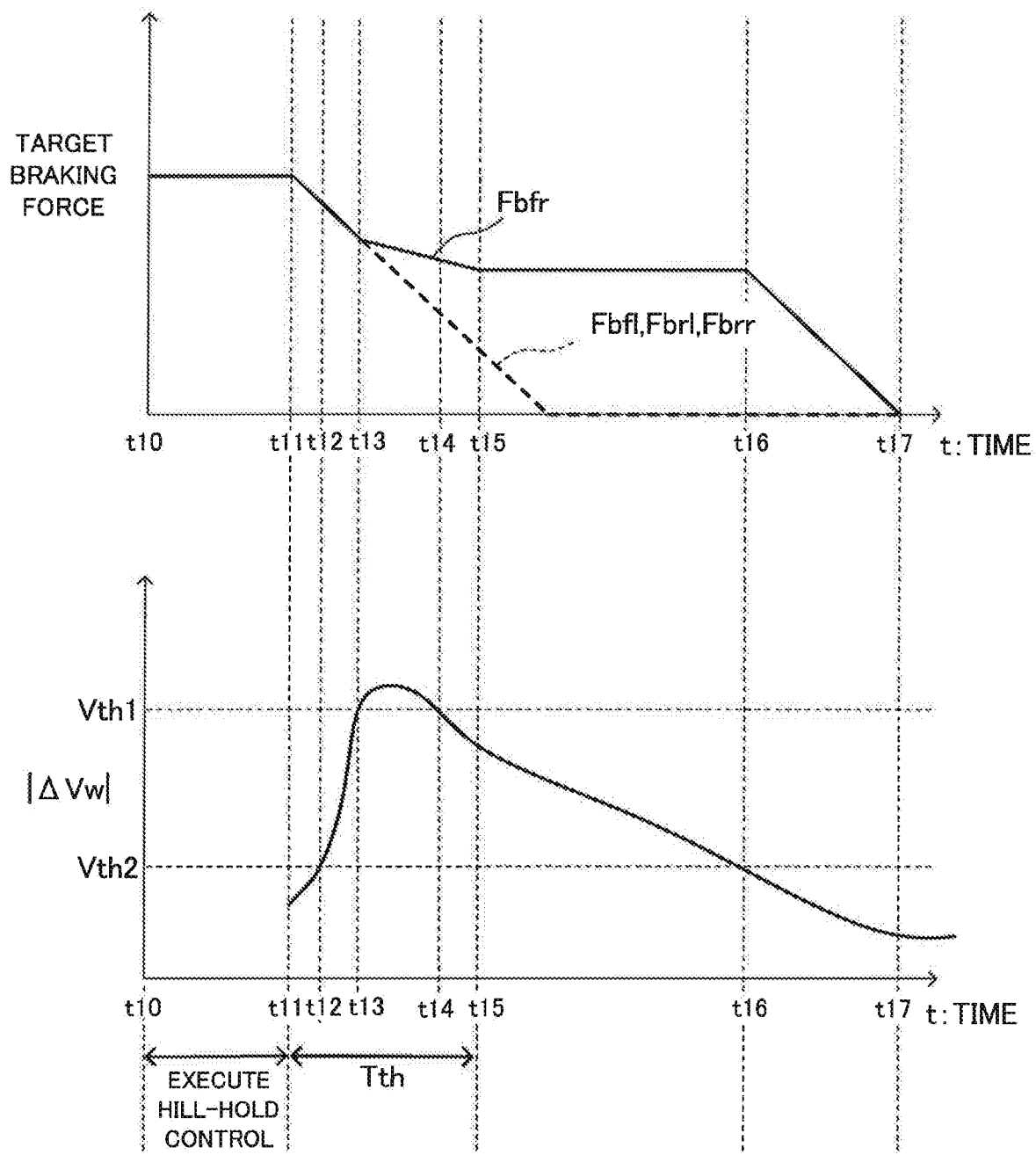
FIG. 10 is a time-series chart for illustrating a behavior of the vehicle when the control apparatus executes the hill-hold control and the braking force cancel control in a situation in which the vehicle starts on a slope which is a "split μ road".

In an example illustrated in FIG. 10, the situation up to the time point t12 is the same as the example illustrated in FIG. 9, and therefore, the description is omitted. The flow of the processing after the time point t13 will be described. In the fourth situation, the right road surface μ is smaller than the left road surface μ, and therefore, the wheel speed Vwfr of the right front wheel Wfr becomes rapidly larger than the wheel speed Vwfl of the left front wheel Wfl. As a result, the absolute value of the vehicle speed difference ΔVw becomes large rapidly as illustrated in FIG. 10.

At the time point t13, the CPU2 starts the routine of FIG. 6 from Step 600, and proceeds to Step 603. Since the absolute value of the vehicle speed difference ΔVw is equal to or larger than the first threshold Vth1, the CPU2 makes a "Yes" determination in Step 603, and proceeds to Step 604. In Step 604, the CPU2 determines whether or not the wheel speed Vwfl is higher than the wheel speed Vwfr.

Now, the wheel speed Vwfr is higher than the wheel speed Vwfl. Thus, the CPU2 makes a "No" determination in Step 604, and proceeds to Step 606.

In Step 606, the CPU2 sets the target braking force Fbfr to a value "Fbfr'-ΔB3". Meanwhile, the CPU2 sets the target braking force Fbfl to a value "Fbfl'-ΔB2". Further, the CPU2 sets the target braking force Fbr* to a value "Fbr*'-ΔB2" for each rear wheel Wr*. The CPU2 stores in the RAM information on the target braking forces Fbi, and information on the reduction amounts ΔBi used this time.

Next, the CPU2 executes the processing of Step 630 as described above, and then, proceeds to Step 695 to tentatively terminate this routine.

The CPU2 executes the above processing each time the predetermined time (Δts) elapses to thereby decrease the target braking force Fbfr corresponding to the drive wheel (right front wheel Wfr) which is in contact with the right road surface having the lower friction coefficient μ as follows. Specifically, the amount (ΔB3) of reduction per unit time (Δts) in the target braking force Fbfr becomes smaller than the amount (ΔB2) of reduction per unit time (Δts) in the target braking forces (Fbfl, Fbrl and Fbrr) of the other wheels (Wfl, Wrl and Wrr). Therefore, the braking pressure of the wheel cylinder 24*fr* corresponding to the right front wheel Wfr becomes larger than the braking pressures of the wheel cylinders (24*fl*, 24*rl* and 24*rr*) corresponding to the other wheels (Wfl, Wrl and Wrr). Accordingly, it is possible to suppress the slip of the right front wheel Wfr. After the time point t13, the absolute value of the vehicle speed difference ΔVw changes from an upward trend to a downward trend.

At the time point t14, the CPU2 starts the routine of FIG. 6 from Step 600, and proceeds to Step 603. Since the absolute value of the vehicle speed difference ΔVw is smaller than the first threshold Vth1, the CPU2 makes a "No" determination in Step 603, and proceeds to Step 610. Further, the absolute value of the vehicle speed difference ΔVw is larger than the second threshold Vth2, and thus, the CPU2 makes a "No" determination in Step 610, and proceeds to Step 614.

In Step 614, for each wheel Wi, the CPU2 obtains a value calculated by subtracting the reduction amount ΔBi' from the target braking force Fbi', and sets the target braking force Fbi to the calculated value "Fbi'-ΔBi'". In this case, the reduction amount ΔBfr' previously used for the target braking force Fbfr is "ΔB3". Thus, the CPU2 sets the target braking force Fbfr to a value "Fbfr'-ΔB3". Meanwhile, the reduction amounts (ΔBfl', ΔBrl' and ΔBrr') previously used for the other target braking forces (Fbfl, Fbrl and Fbrr) are "ΔB2". Thus, the CPU2 sets the target braking force Fbfl to a value "Fbfl'-ΔB2". Further, the CPU2 sets the target braking force Fbr* to a value "Fbr*'-ΔB2" for each rear wheel Wr*. The CPU2 stores in the RAM information on the target braking forces Fbi, and information on the reduction amounts ΔBi used this time.

Next, the CPU2 executes the processing of Step 630 as described above, and then, proceeds to Step 695 to tentatively terminate this routine.

In this manner, the CPU2 continues executing the above processing such that the amount (ΔB3) of reduction per unit time in the target braking force Fbfr corresponding to the right front wheel Wfr becomes smaller than the amount (ΔB2) of reduction per unit time in the target braking forces (Fbfl, Fbrl and Fbrr) corresponding to the other wheels (Wfl, Wrl and Wrr). Therefore, it is possible to suppress the slip of the right front wheel Wfr.

The time point t15 is a time point immediately after the elapsed time Tep becomes longer than the time threshold Tth. At the time point t15, the CPU2 starts the routine of FIG. 6 from Step 600, and proceeds to Step 602. The CPU2 makes a "No" determination in Step 602, and proceeds to Step 620.

The target braking forces Fbi of all the wheels have not yet become zero at this time point, Thus, the CPU2 makes a "No" determination in Step 620, and proceeds to Step 622. Since the absolute value of the vehicle speed difference ΔVw is larger than the second threshold Vth2, the CPU2 makes a "Yes" determination in Step 622, and proceeds to Step 623. Further, the CPU2 makes a "No" determination in Step 623, and proceeds to Step 625.

In Step 625, the CPU2 sets the target braking force Fbfr to the previous target braking force Fbfr'. In this manner, for the right front wheel Wfr, the target braking force Fbfr is maintained at the previous target braking force Fbfr'. Further, the CPU2 sets the target braking force Fbfl to a value "Fbfl'-ΔB2", In addition, for each rear wheel, the CPU2 sets the target braking force Fbr* to a value "Fbr*'-ΔB2". When the target braking force Fbfl<0, the CPU2 sets the target braking force Fbfl to "0". When the target braking force Fbr*<0, the CPU2 sets the target braking force Fbr* to "0". The CPU2 stores in the RAM information on the target braking forces Fbi, and information on the reduction amounts ΔBi used this time.

Next, the CPU2 executes the processing of Step 630 as described above, and then, proceeds to Step 695 to tentatively terminate this routine.

By executing the above processing, the braking pressure of the wheel cylinder 24*fr* corresponding to the right front wheel Wfr is maintained (kept), and the braking pressures of the wheel cylinders (24*fl*, 24*rl* and 24*rr*) corresponding to the other wheels (Wfl, Wrl and Wrr) are gradually decreased to thereby become zero finally. Therefore, while suppressing the slip of the right front wheel Wfr, the braking force applied to the left front wheel Wfl is cancelled, and the driving force of the left front wheel Wfl is transmitted to the road surface. As a result, the vehicle SV can start on a slope which is the split μ road without moving backward.

At the time point t16, the CPU2 starts the routine of FIG. 6 from Step 600, and proceeds to Step 622. Since the absolute value of the vehicle speed difference ΔVw is equal to or smaller than the second threshold Vth2, the CPU2 makes a "No" determination in Step 622, and proceeds to Step 626.

In Step 626, the CPU2 sets the target braking force Fbi to a value "Fbi*'-ΔB2" for each wheel. At this time point, the target braking forces Fbfl, Fbrl and Fbrr are already zero. Therefore, the CPU2 sets the target braking force Fbfr to a value "Fbfr'-ΔB2". When the target braking force Fbfr<0, the CPU2 sets the target braking force Fbfr to "0".

Next, the CPU2 executes the processing of Step 630 as described above, and then, proceeds to Step 695 to tentatively terminate this routine.

By repeatedly executing the above processing, the braking pressure of the wheel cylinder 24*fr* corresponding to the right front wheel Wfr is decreased to thereby become zero finally. At the time point t17, the CPU2 starts the routine of FIG. 6 from Step 600, and proceeds to Step 620. At this time point, the target braking forces Fbi of all the wheels are zero. Thus, the CPU2 makes a "Yes" determination in Step 620, and proceeds to Step 621. In Step 621, the CPU2 sets the values of the third flag Fbc to "0". Thereafter, the CPU2 proceeds to Step 695 to tentatively terminate this routine. When the CPU2 again starts the routine of FIG. 6 and proceeds to Step 601, the CPU2 makes a "No" determination in Step 601, and proceeds directly to Step 695, Therefore, the braking force cancel control is terminated.

In this manner, when the absolute value of the vehicle speed difference ΔVw is equal to or larger than the first threshold Vth1, the control apparatus decreases the braking force applied to the right front wheel Wfr which is the drive wheel having the higher wheel speed among the drive wheels Wfl and Wfr as follows. Specifically, the amount (ΔB3) of reduction per unit time (Δts) in the braking force applied to the right front wheel Wfr becomes smaller than the amount (ΔB2) of reduction per unit time (Δts) in the braking forces applied to the other wheels (Wfl, Wrl and Wrr). The control apparatus decreases the braking force for each wheel Wi while applying to the right front wheel Wfr having the higher wheel speed the braking force larger than that applied to the left front wheel Wfl. Accordingly, the control apparatus can suppress the slip of the right front wheel Wfr which is in contact with the right road surface having the lower friction coefficient μ.

Further, in the same manner as the third situation, before executing the TRC, the control apparatus can apply to the right front wheel Wfr having the higher wheel speed the braking force larger than that applied to the left front wheel Wfl. The control apparatus can suppress the slip of the right front wheel Wfr without executing the TRC.

Further, on and after the elapsed time Tep since the time point at which the braking force cancel control is started becomes longer than the time threshold Tth, when the absolute value of the vehicle speed difference ΔVw is larger than the second threshold Vth2, the control apparatus maintains the braking force of the right front wheel Wfr, and decreases the braking forces of the wheels (Wfl, Wrl and Wrr) other than the right front wheel Wfr. Therefore, the braking force of the left front wheel Wfl is gradually cancelled while suppressing the slip of the right front wheel Wfr, and therefore, the driving force of the left front wheel Wfl is transmitted to the road surface. As a result, the vehicle SV can start on a slope which is the split μ road without moving backward.

The present disclosure is not limited to the embodiment described above, and various modification examples can be adopted within the scope of the present disclosure.

MODIFICATION EXAMPLE 1

When executing the routine of FIG. 6, the CPU2 may change the threshold Vth1 used in Step 603 in accordance with the road surface μ state of the road in front of the vehicle SV. Specifically, when the value of the first flag Fsp is "0" (that is, the road in front of the vehicle SV is the left-and-right uniform μ road). the CPU2 sets the first threshold Vth1 to a predetermined reference threshold Vref (Vth1←Vref). Here, Vref>Vth2. On the other hand, when the value of the first flag Fsp is "1" (that is, the road in front of the vehicle SV is the split μ road), the CPU2 sets the first threshold Vth1 to a value obtained by subtracting a predetermined positive value α from the reference threshold Vref (Vth1←Vref−α). Here, (Vref−α)>Vth2.

When the road in front of the vehicle SV is the split μ road, the CPU2 sets a magnitude of the first threshold Vth1 so as to become smaller than that of when the road in front of the vehicle SV is the left-and-right uniform μ road. According to this modification example, when the road in front of the vehicle SV is the split μ road, before the absolute value of the wheel speed difference ΔVw becomes large, the amount of reduction per unit time in the target braking force Fbf* corresponding to the drive wheel Wf* which is in contact with the road surface having the lower friction coefficient μ becomes smaller than the amount of reduction per unit time in the target braking forces of the other wheels. Therefore, it is possible to further reduce the possibility of the slip of the drive wheel Wf which is in contact with the road surface having the lower friction coefficient μ.

MODIFICATION EXAMPLE 2

Figure 11:
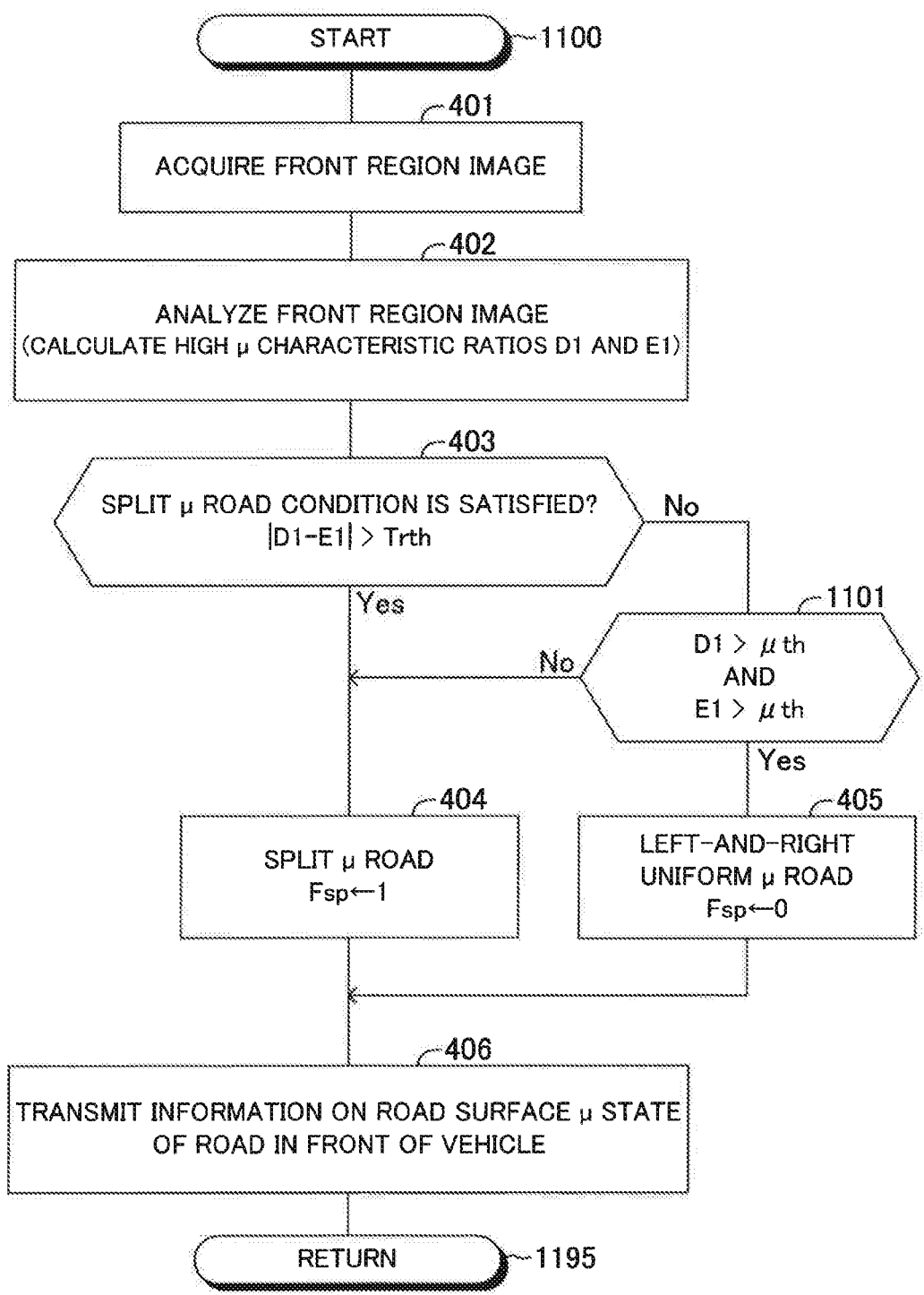
FIG. 11 is a flowchart for, illustrating a "road surface μ state determination routine" to be executed by the CPU of the image processing ECU according to a modification example.

The CPU1 may execute a routine of FIG. 11 in place of the routine of FIG. 4. The routine of FIG. 11 is a routine in which Step 1101 is added between Step 403 and Step 405 in the routine of FIG. 4. Therefore, detailed description of steps denoted by the same reference numerals as those in FIG. 4 is omitted.

When the CPU1 makes a "No" determination in Step 403 and proceeds to Step 1101, the CPU1 determines whether or not the following high μ road condition is satisfied.

(High μ road condition): The high μ characteristic ratio D1 is larger than a predetermined threshold μth, and the high μ characteristic ratio E1 is larger than the threshold μth.

When the high μ road condition is satisfied, the CPU1 makes a "Yes" determination in Step 1101, and executes the processing, of Steps 405 and 406 in sequence. Thereafter, the CPU1 proceeds to Step 1195 to tentatively terminate this routine.

On the other hand, when the high μ road condition is not satisfied, the CPU1 makes a "No" determination in Step 1101, and executes the processing of Steps 404 and 406 in sequence. Thereafter, the CPU1 proceeds to Step 1195 to tentatively terminate this routine. In this manner, even in the case where the road in front of the vehicle SV is the left-and-right uniform μ road, when the high μ characteristic ratios D1 and E1 are both relatively small, the value of the first flag Fsp is set to "1". According, to this modification example, when both of the left road surface and the right road surface have a relatively low friction coefficient μ, and it can be considered that there is no left-and-right μ difference, the control apparatus executes the routine of FIG. 6 as in the case of the split μ road.

When both of the left road surface and the right road surface have a relatively low friction coefficient μ, and it can be considered that there is no left-and-right μ difference (Step 1101:No), the control apparatus decreases the braking forces as follows. Specifically, by executing the routine of FIG. 6 (Step 611:No and Step 613), the amount (ΔB2) of reduction per unit time (Δts) in the braking force becomes smaller than the amount (ΔB1) of reduction per unit time (Δts) in the braking force when the road in front of the vehicle SV is the left-and-right uniform μ road having a relatively high friction coefficient μ (Step 1101:Yes). Therefore, the drive wheels Wfl and Wfr are gradually rotated without being rapidly rotated. The drive wheels Wfl and Wfr can easily grip the road surface. Therefore, the possibility that the vehicle SV moves backward can be reduced,

MODIFICATION EXAMPLE 3

The hill-hold control start condition in Step 502 in the routine of FIG. 5 is not limited to the above example. The hill-hold control start condition may include the following Condition A4 in addition to Conditions A1 to A3.

(Condition A4): A road gradient is equal to or larger than a predetermined gradient threshold. The CPU2 may acquire information on the road gradient from a gradient sensor (not shown). In another example, the CPU2 may calculate the road gradient based on the acceleration Gs detected by the acceleration sensor 43 and the acceleration of gravity g.

MODIFICATION EXAMPLE 4

An additional step may be incorporated between Step 602 and Step 603 in the routine of FIG. 6. In this additional step, the CPU2 determines whether or, not the value of the first flag Fsp is "1". In this modification example, after Step 602, the CPU2 proceeds to the additional step to determine whether or the value of the first flag Fsp is "1". When the value of the first flag Fsp is "1", the CPU2 proceeds to Step 603. On the other hand, when the value of the first flag Fsp is "0", the CPU2 proceeds to Step 612. In this manner, only when the value of the first flag Fsp is "1" (that is, the road in front of the vehicle SV is the split μ road), the CPU2 may execute the processing of Steps 603 to 606.

What s claimed is:

1. A control apparatus for a vehicle, comprising:
an imaging device configured to capture a front region of the vehicle to acquire a front region image;
a wheel speed sensor configured to detect a wheel speed of each of a plurality of wheels included in the vehicle;
a driving device configured to control a driving force applied to drive wheels among the plurality of the wheels;
a braking device configured to control a braking force applied to each of the plurality of the wheels; and
a controller configured to
execute hill-hold control for, when the vehicle is in a stopped state, controlling the braking device to apply the braking force to the plurality of wheels during a period from a first time point at which a driver stops operating a brake pedal to a second time point, at which the driver starts operating an accelerator pedal, and
execute braking force cancel control for decreasing the braking force to zero for each of the plurality of wheels on and after the second time point,
wherein the controller is further configured to determine whether a road in front of the vehicle is a split μ road or a left-and-right uniform μ road based on the front region image, the split μ road being a road which can be considered that there is a left-and-right μ difference, the left-and-right uniform μ road being a road which can be considered that there is no left-and-right μ difference, and the left-and-right μ difference representing a magnitude of a difference between a friction coefficient of a road surface with which the wheel on a left side of the vehicle is in contact, and the friction coefficient of a road surface with which the wheel on a right side of the vehicle is in contact,
wherein the controller is further configured to, when executing the braking force cancel control, decrease the braking force such that a magnitude of an amount of reduction in the braking force per unit time when determining that the road in front of the vehicle is the split μ road becomes smaller than a magnitude of an amount of reduction in the braking force per unit time when determining that the road in front of the vehicle is the left-and-right uniform μ road,
wherein the controller is further configured to, when executing the braking force cancel control,
in a situation in which a magnitude of a wheel speed difference between the wheel speed of one wheel among the drive wheels and the wheel speed of the other wheel among the drive wheels is equal to or larger than a predetermined first threshold,
decrease the braking force such that a magnitude of an amount of reduction in the braking force per unit time for a first drive wheel becomes smaller than a magnitude of an amount of reduction in the braking force per unit time for the wheels other than the first drive wheel, the first drive wheel being a wheel having a higher wheel speed among the drive wheels, and
wherein the controller is further configured to set the predetermined first threshold such that the predetermined first threshold when determining that the road in front of the vehicle is the split μ road becomes smaller than the predetermined first threshold when determining that the road in front of the vehicle is the left-and-right uniform μ road.

2. The control apparatus according to claim 1, wherein the controller is further configured to, on and after an elapsed time since the braking force cancel control is started becomes longer than a predetermined time threshold,
maintain the braking force applied to the first drive wheel and decrease the braking forces applied to the wheels other than the first drive wheel when the magnitude of the wheel speed difference is larger than a predetermined second threshold which is smaller than the predetermined first threshold, and
decrease the braking forces for all the plurality of wheels when the magnitude of the wheel speed difference is equal to or smaller than the predetermined second threshold.

* * * * *